US011587177B2

(12) United States Patent
Sankar et al.

(10) Patent No.: US 11,587,177 B2
(45) Date of Patent: Feb. 21, 2023

(54) JOINED AND COORDINATED DETECTION, HANDLING, AND PREVENTION OF CYBERATTACKS

(71) Applicant: Palantir Technologies Inc., Denver, CO (US)

(72) Inventors: Shyam Sankar, Palo Alto, CA (US); Jacob Albertson, New York, NY (US); Melody Hildebrandt, New York, NY (US); Harkirat Singh, New York, NY (US); Rick Ducott, San Francisco, CA (US); Peter Maag, New York, NY (US); Marissa Kimball, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 493 days.

(21) Appl. No.: 14/919,506

(22) Filed: Oct. 21, 2015

(65) Prior Publication Data

US 2016/0112445 A1 Apr. 21, 2016

Related U.S. Application Data

(60) Provisional application No. 62/066,716, filed on Oct. 21, 2014.

(51) Int. Cl.
*H04L 29/06* (2006.01)
*G06Q 40/08* (2012.01)
*H04L 9/40* (2022.01)

(52) U.S. Cl.
CPC ......... *G06Q 40/08* (2013.01); *H04L 63/1416* (2013.01); *H04L 63/1425* (2013.01); *H04L 63/1433* (2013.01); *H04L 63/1466* (2013.01)

(58) Field of Classification Search
CPC . G06Q 40/08; H04L 63/1466; H04L 63/1416; H04L 63/1433; H04L 63/1425
(Continued)

(56) References Cited

U.S. PATENT DOCUMENTS 6,556,992 B1  4/2003  Barnet et al.
7,319,970 B1  1/2008  Barnet et al.
(Continued)

FOREIGN PATENT DOCUMENTS

AU   2014388092 A1   9/2016
AU   2018229433 B2   3/2020
(Continued)

OTHER PUBLICATIONS

Choi, S.W., Authorized Officer, Korean Intellectual Property Office, International Search Report and Written Opinion, International Application No. PCT/US2015/056520, dated Jan. 29, 2016, 13 pages.
(Continued)

*Primary Examiner* — Lynn D Feild
*Assistant Examiner* — Abdullah Almamun
(74) *Attorney, Agent, or Firm* — Knobbe, Martens, Olson & Bear, LLP

(57) ABSTRACT

Methods, devices, systems and computer program products enable monitoring and responding to cyber security attacks. One such system relates to a consortium of monitoring companies and an infrastructure including one or more central monitoring stations or local handling stations for a monitoring company are provided. A central monitoring station of a monitoring company detects a cyberattack that has been launched against a client computer system, and requests a local station to respond to the cyberattack via onsite visits or requests additional resources from other monitoring companies through the consortium system. The
(Continued)

central monitoring station also sends to the consortium system updates on a cyberattack that is detected or mitigated by a central monitoring station or local handling station of the monitoring company. The monitoring consortium enables stronger capabilities than any individual monitoring company can offer by the combination and coordination of the efforts and resources of the members.

7 Claims, 19 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,467,145 B1 | 12/2008 | Castellanos et al. | |
| 8,484,730 B1* | 7/2013 | P. R. .................. | G06F 11/3438 |
| | | | 709/225 |
| 8,494,955 B2 | 7/2013 | Quarterman et al. | |
| 9,009,827 B1 | 4/2015 | Albertson et al. | |
| 9,239,908 B1* | 1/2016 | Constantine ............ | G06F 21/00 |
| 9,661,013 B2* | 5/2017 | Reno ...................... | G06F 21/85 |
| 9,692,779 B2* | 6/2017 | Maeng ................... | G06F 21/56 |
| 9,754,106 B2* | 9/2017 | Roundy ................. | G06F 21/554 |
| 9,760,849 B2* | 9/2017 | Vinnakota ........... | G06Q 10/0635 |
| 9,767,318 B1 | 9/2017 | Dropps | |
| 2002/0087364 A1 | 7/2002 | Lerner et al. | |
| 2003/0225667 A1 | 12/2003 | Sato | |
| 2005/0102534 A1 | 5/2005 | Wong | |
| 2005/0187940 A1 | 8/2005 | Lora et al. | |
| 2005/0235360 A1* | 10/2005 | Pearson .................. | H04L 29/06 |
| | | | 726/23 |
| 2006/0282892 A1* | 12/2006 | Jonnala ............... | H04L 63/1458 |
| | | | 726/23 |
| 2008/0109455 A1 | 5/2008 | Katz | |
| 2009/0024627 A1 | 1/2009 | King | |
| 2009/0024663 A1 | 1/2009 | McGovern | |
| 2009/0037215 A1 | 2/2009 | Dale | |
| 2011/0040582 A1 | 2/2011 | Kieran | |
| 2011/0126259 A1* | 5/2011 | Krishnamurthi ...... | H04L 43/026 |
| | | | 726/1 |
| 2012/0166209 A1 | 6/2012 | Lacal | |
| 2013/0074188 A1* | 3/2013 | Giakouminakis ....... | G06F 21/57 |
| | | | 726/25 |
| 2013/0086685 A1 | 4/2013 | Haynes | |
| 2013/0227697 A1* | 8/2013 | Zandani .............. | H04L 63/1433 |
| | | | 726/25 |
| 2013/0268287 A1 | 10/2013 | Hufford et al. | |
| 2013/0332191 A1 | 12/2013 | Hoffman et al. | |
| 2013/0340076 A1* | 12/2013 | Cecchetti ................ | G06F 21/55 |
| | | | 726/23 |
| 2014/0081671 A1 | 3/2014 | Schaad | |
| 2014/0142988 A1 | 5/2014 | Grosso | |
| 2014/0237599 A1* | 8/2014 | Gertner ................. | H04L 63/145 |
| | | | 726/24 |
| 2014/0278588 A1 | 9/2014 | Burgoon, Jr. et al. | |
| 2015/0172311 A1* | 6/2015 | Freedman ........... | H04L 63/1433 |
| | | | 726/1 |
| 2016/0050225 A1* | 2/2016 | Carpenter ........... | H04L 63/1433 |
| | | | 726/25 |
| 2016/0065603 A1* | 3/2016 | Dekel ................. | H04L 63/1425 |
| | | | 726/23 |
| 2016/0134653 A1* | 5/2016 | Vallone ............... | H04L 63/1433 |
| | | | 726/25 |
| 2016/0142427 A1* | 5/2016 | de los Reyes ...... | H04L 63/1441 |
| | | | 726/23 |
| 2016/0301710 A1* | 10/2016 | Hason ..................... | H04L 67/22 |

FOREIGN PATENT DOCUMENTS

| | | |
|---|---|---|
| JP | 2002083121 | 3/2002 |
| WO | 2011146284 | 11/2011 |
| WO | 2015144220 A1 | 10/2015 |

OTHER PUBLICATIONS

Choi, S.W., Authorized Officer, Korean Intellectual Property Office, International Search Report and Written Opinion, International Application No. PCT/US2015/056734, dated Feb. 1, 2016, 14 pages.

Lee, M. J., Authorized Officer, Korean Intellectual Property Office, International Search Report and Written Opinion, International Application No. PCT/US2015/057978, dated Feb. 5, 2016, 13 pages.

Lee, M. J., Authorized Officer, Korean Intellectual Property Office, International Search Report and Written Opinion, International Application No. PCT/US2015/057992, dated Feb. 11, 2016, 11 pages.

S. L. Pfleeger and R. Rue, "Cybersecurity Economic Issues: Clearing the Path to Good Practice," in IEEE Software, vol. 25, No. 1, pp. 35-42, Jan.-Feb. 2008 (Year: 2008).

* cited by examiner

Asset Risk Profile 302

① Asset A: 304a
- Location (Public-Internet/Private-LAN/DMZ)
- Operating Sys (version, etc.)
- Known vulnerabilities (existing exploits)
- Future vulnerabilities (likelihood based on historical analysis-window 75% than Linux
- etc.
- Risk Assessment 308

⟵ Risk Indicators 306

② Asset B 304b

...

③ Asset n 304n

*FIG. 3A*

Asset Damage Profile 312

① Asset A 304a
- Data stored (credit card vs. webpages)
- Hardware (failovers operational?)
- Down time
- Reputation (and other intangibles)
- etc.
- Damage Assessment ⟵ Damage Indicators 316

② Asset B 304b

...

③ Asset n 304n

*FIG. 3B*

Company Risk Profile(s) 322

① Company A: 324a
- Capital Investment (how much do they want to spend?)
- Risk tolerance (low, med, high—it's a subject based on customer)
- # of assets
- # of security measures (do they have a NOC/security team/Disaster Recovery Plan?)
- # of employees (could be an internal attack)
- Public vs. Private Co. (are they high profile)
- Line of business (Big Co. vs. Small Co.)
- History of Attacks
- etc.
- Company Risk Assessment 328

} Company Indicators 326

② Company B: 324b

...

③ Company n: 324c

*FIG. 3C*

| | |
|---|---|
| 1302 — | Member Registration |
| | Basic Information |
| | 1. Name |
| | 2. Headquarter location |
| 1304 — | Client Computer Systems |
| | 1. Total Number |
| | 2. Geographical spread |
| | 3. Industry distribution |
| 1306 — | Central Managing Stations |
| | 1. Station 1 |
| |     a. Address |
| |     b. Contact information |
| |     c. Level of computing power |
| | 2. Station 2 |
| |     a. …. |
| 1308 — | Local Handling Stations |
| | 1. Station 1 |
| |     a. Address |
| |     b. Contact information |
| |     c. Hours of operation |
| |     d. Level of computing power |
| |     e. Number of specialists |
| |     f. Areas of specialty |
| | 2. Station 2 |
| |     a. …. |

| | 1310 — Information Disclosure | 1312 — Information Receipt |
|---|---|---|
| 1314 — | 1. Structure and capabilities | 1. Structure and capabilities |
| |     a. Creation, termination, failure, or recovery of stations |     a. Creation, termination, failure, or recovery of stations |
| 1316 — |     b. Change and availability in human or computational resources |     b. Change and availability in human or computational resources |
| | 2. Cyberattack information | 2. Cyberattack information |
| |     a. Suspicion of threat |     a. Suspicion of threat |
| |     b. Detection of occurrence |     b. Detection of occurrence |
| |     c. Identification of source |     c. Identification of source |
| |     d. Removal of source |     d. Removal of source |
| 1318 — |     e. Containment of effect |     e. Containment of effect |
| |     f. Recovery |     f. Recovery |
| | 3. Cybersecurity information | 3. Cybersecurity information |

*FIG. 13*

1402 — Cyberattack Data (one entry for one occurrence)
Basic Information
1. Time of occurrence
2. Category (malware, zombie, malicious user, etc.)
3. Name (program name, system name, user ID, etc.)
4. Scope of damage (number of documents created, modified, deleted, accessed without permission; number of servers crashed (for how long); number of databases wiped out (for how long), etc.)

1404 — Attackers
1. User ID
2. Location
3. Nationality

1406 — Targets
1. Location
2. Industry
3. Nature and level of computing resources 1408 — Detection Approach
1. Method (signature identification, login pattern analysis, etc.)
2. Timing (preventive, after-the-fact)

1410 — Handling Approach
1. Method (document deletion, system reboot, etc.)
2. Onsite support (none, two specialists in access control and one specialist in data restoration for 3 days, etc.)
3. Member assistance (yes, no)

*FIG. 14*

JOINED AND COORDINATED DETECTION, HANDLING, AND PREVENTION OF CYBERATTACKS

CROSS REFERENCE TO RELATED APPLICATIONS

This patent application claims priority to U.S. Provisional Application No. 62/066,716, filed Oct. 21, 2014. The entire content of the before-mentioned provisional patent application is incorporated by reference as part of the disclosure of this application.

TECHNICAL FIELD

The present disclosure relates generally to systems, apparatuses, and methods and computer program that are stored on non-transitory storage media (collectively referred to as the "technology") related to determining a company's vulnerability to a cyber security related attack and, based on the level of vulnerability, responding to the cyber attack using joined efforts in maintaining cybersecurity through a sharing of data and resources.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Today, the field of cybersecurity is of growing importance due to the increasing reliance on computer systems in most societies. Few computer systems are free of vulnerabilities that can be exploited by hackers, criminal organizations, or the like, who are often ready to attack these computer systems at any time. When computer systems are under these cyberattacks, individual or enterprise operations are often interrupted, disrupted, or terminated, possibly leading to serious financial damage or irreversible loss. By applying security measures to detect, handle, and prevent cyberattacks, the field of cybersecurity aims to ensure the confidentiality, integrity, and availability of data on the computer systems and is thus important to the societies today.

Over time, as computer systems become larger and more complex, cyberattacks also become more sophisticated, with broader or deeper impact. Today, there are a large number of known types of malware which grow and spread in various ways, such as by self-sustaining or self-replicating, having numerous undesirable effects, such as unauthorized data access and network communication or server crashes and service denials. Unlike traditional attacks of natural disasters, manmade errors, or physical crimes, cyberattacks can easily be replicated on different computer systems, often crossing industrial, geographical, or other boundaries. Also unlike traditional attacks, cyberattacks exist in ever-reinvented forms, making them harder to track and manage. Therefore, known processes of monitoring and managing traditional attacks can be ineffective for cyberattacks.

SUMMARY OF CERTAIN EMBODIMENTS

Some embodiments of the disclosed technology relate to methods, devices and computer programs that enable collective and joint monitoring of cyberattacks and responding to those attacks based on a collaborative approach.

For example, one aspect of the disclosed technology relates to a consortium system of monitoring companies and an infrastructure including one or more central monitoring stations or local handling stations for a monitoring company are provided. A central monitoring station of a monitoring company detects a cyberattack that has been launched against a client computer system. The central monitoring station then requests a local handling station to respond to the cyberattack via onsite visits or requests additional resources from other monitoring companies through the consortium system. The central monitoring station also sends to the consortium system updates on a cyberattack that is detected or mitigated by a central monitoring station or local handling station of the monitoring company. The consortium system pools data received from the central monitoring stations of member monitoring companies, provides summaries and observations to help recognize pending cyberattacks and prevent future cyberattacks, and also organizes the pooled data for further analysis by the members. The consortium also coordinates the handling of cyberattacks with resources from all the members.

The monitoring consortium enables stronger capabilities than any individual monitoring company can offer by the combination of the efforts and resources of the members. Clients therefore enjoy a superior level of security for their computer systems, which maximizes the confidentiality, integrity, and availability of their data and business operations and minimizes their waste of resources and mental pain and suffering.

BRIEF DESCRIPTION OF THE DRAWINGS

FIG. 3A illustrates an exemplary asset risk profile that may employ aspects of the described technology.

FIG. 3B illustrates an exemplary asset damage profile that may employ aspects of the described technology.

FIG. 3C illustrates an exemplary company risk profile that may employ aspects of the described technology.

FIG. 13 illustrates a sample member profile corresponding to a registration request submitted by a central monitoring station to the consortium system in accordance with an exemplary embodiment.

FIG. 14 illustrates example data in the repository maintained by the consortium system regarding a particular cyberattack in accordance with an embodiment.

DETAILED DESCRIPTION

Figure 1:
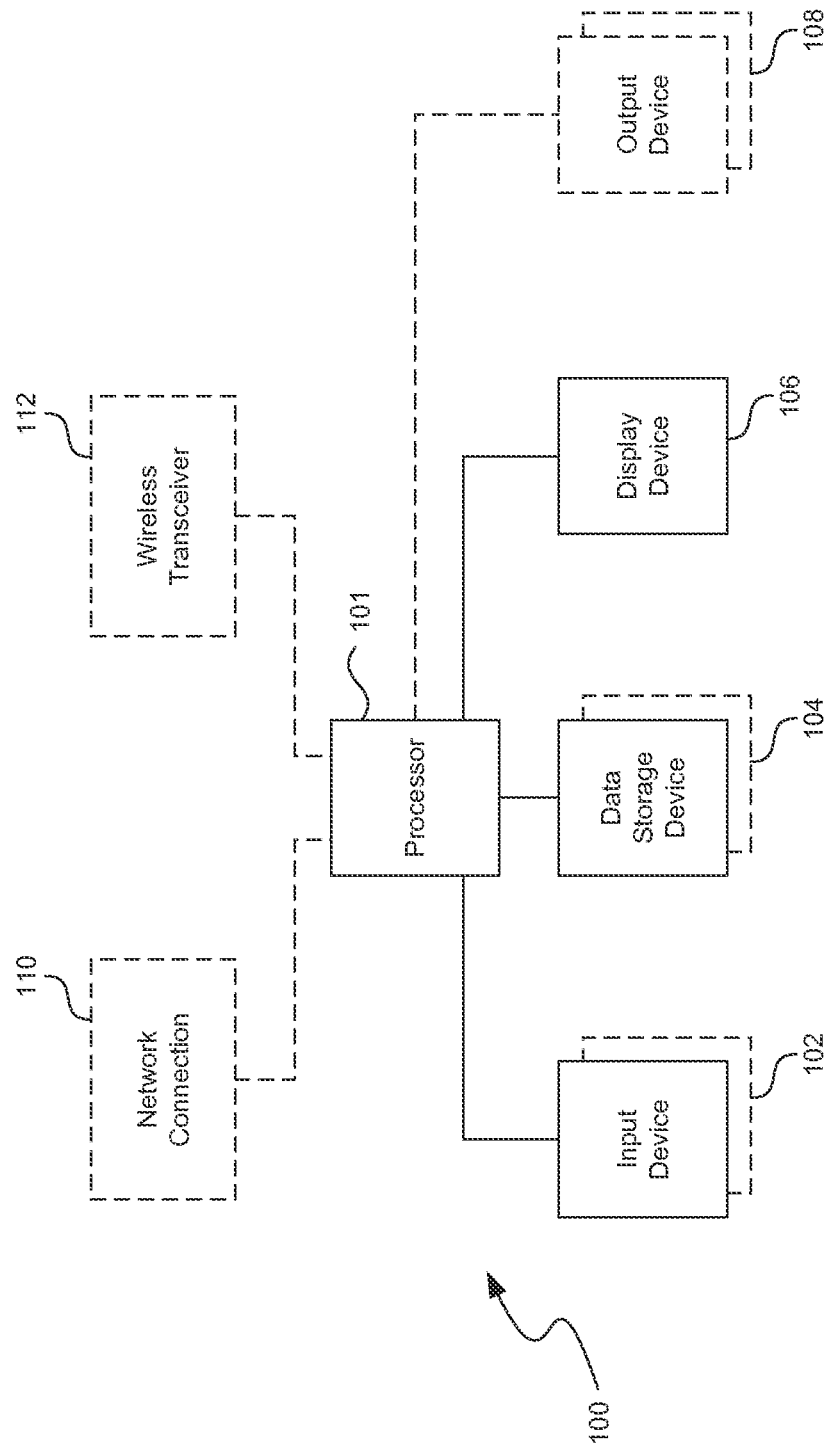
FIG. 1. is a block diagram of a basic and suitable computer that may employ aspects of the described technology.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Some embodiments of the disclosed technology relate to methods, devices and computer programs that facilitate determination of cyber insurance. Before describing certain details of cyber insurance, it is instructive to note that insurance is a form of risk management tool primarily used by individuals, businesses, and other organizations to hedge against the risk of a contingent, uncertain loss that they can't or don't want to bear alone. An insured, or policyholder, can buy an insurance policy from an insurer, or insurance carrier, for an amount of money, called the premium, for a certain amount of insurance coverage specified by an insurance policy. Traditionally, insurance policies available to cover losses from business may be classified as: (1) business personal insurance policies to cover first-party losses; (2) business interruption policies; (3) commercial general liability or umbrella liability insurance policies, to cover liability for damages to third parties; and (4) errors and omissions insurance to cover the company's officers. These traditional insurance policies were designed to cover the traditional perils of fires, floods, and other forces of nature.

In the last half a century, computers have become an integrated part of life for any individuals and organizations. As organizations become more dependent on their networked computer assets, they become more vulnerable to harm from increasing frequent and damaging attacks made possible by computers. Since traditional insurance policies are normally written before the advent of the Internet, they do not expressly cover new computer related risks. Cyber insurance is a specialty insurance product that covers losses associated with a company's information assets including computer generated, stored, and processed information. Cyber insurance may become part of the overall solution to computer network and system security, which becomes more and more important due to the increasing number of virus attacks, hacker assaults, and other IT security incidents. However, due to the ever-changing nature of cyber security and cyber vulnerabilities, traditional insurance or even cyber insurance policies and associated premiums do not adequately correspond to the level of risk that is associated with a computer asset.

Cyber insurance can, in principle, be an important risk-management tool for strengthening IT security and reliability for companies. There may be many parties involved in the cyber insurance industry including underwriters, agents, and clients, code writers, inspectors, and vendors of products and services, working together to provide the needed coverage for the policy holders.

In some cases, specialized policies can cover losses from computer viruses or other malicious code, destruction or theft of data, business interruption, denial of service, and/or liability resulting from e-commerce or other networked IT failures. In some other cases, insurance policies for cyber insurance may cover the cost of legal disputes arising from cyber attacks on the insurance policy holder's digital assets. In still other cases, cyber insurance policies may specifically exclude certain coverages such as to exclude coverage of "electronic data," "computer code," and other similar terms as tangible property.

For an insurance policy, the deductible may play an important role in managing cyber security risk. For example, the deducible amount may be a way of lowering the insurance company's risk since a higher deductible can reduce the amount for paying out on a claim. In particular, higher deductibles can be imposed for companies with greater cyber security risks, such as those companies with consistently lower investment in cyber security, with poor security controls or with inadequate IT staff, among other factors. From a risk management point of view, it is important for a company to understand that deductibles affect the premiums. A lower deductible can lead to a higher premium, and vice versa.

Premiums can vary according to specific situation and the amount of coverage, and can range from a few thousand dollars for base coverage for small businesses to several hundred thousand dollars for major corporations with comprehensive coverage. Premiums may depend on the individual company's security risk exposure and can vary substantially depending on the insurance provider. For example, the premiums may depend on the number of computers affected, company level dollar loss distribution, and the timing of the breach event. Premiums may also depend on the industry the company is operating in. For example, a company operating in the high-tech area may rely on computers more with more exposure to computer risks, which leads to a higher premium. A premium may further depend on the elements of the insurance contract, such as the settlement amount that is paid, the occurrence of the event covered by the contract, and the time when the settlement is paid.

Before issuing a cyber insurance policy, an insurance carrier may require audits by independent IT security consultants on a case-by case basis, depending on the risks to be covered and the policy limits sought. To this end, a cyber insurance underwriter may first ask prospective clients to complete an information security assessment that covers items such as: standard configurations with security documentation for firewalls, routers, and operating systems, information security policies, including password management, virus protection, encryption, and security training for employees, vulnerability monitoring and patch management, physical security and access controls, including remote access, privacy and confidentiality policies, backup and restoration provisions, business continuity planning, periodic testing of security controls, and outsourcing and other third-party security provisions.

Various parties of the cyber insurance industry, such as underwriters, agents, and clients, code writers, inspectors, and vendors of products and services, may interact using modern insurance information systems. An insurance information system may need wide functionality, including both traditional tasks of information systems like data processing and storing and more advanced functions that has been traditionally done by humans such as risk evaluation.

These tasks, while may have been sufficiently carried out for traditional insurance policies, suffer from major drawbacks in the realm of cyber insurance due to proliferation of online cyber attacks that can simultaneously and quickly breach many computer systems, databases and networks and result in loss of data, compromise of financial, medical or military secrets or assets. Therefore, there is an urgent need to continuously monitor and predict cyber space activities and relate those activities to risks to an insured (or insurable) product or service. Using such a real-time insurance assessment system benefits both the insured and the insurer by allowing a more accurate and realistic risk assessment to take place, as well as enabling the insurer to quickly alert the insured of impending attacks or existing security vulnerabilities. Further, such a system can be used to create offers for clients and make insurance deals online, to process insurance cases automatically and to automate many other tasks.

In various embodiments, the technology determines one or more cyber insurance policies and/or products based on a company's real-time exposure to a cyber attack on one or more of its computing assets (e.g., a computer serving company data). The technology performs various security analysis techniques to explore, locate, and evaluate a company's assets for creating risk and damage assessments that are used to dynamically determine cyber insurance policies/products that are tailored to that company at that moment of time and, optionally, based on future projections. The technology can continuously or semi-continuously monitor the company's network for any changes to assets and, if changes are detected that could affect the company's exposure to a cyber attack, information associated with the detected changes is fed back to aspects of the technology that are configured to determine new/modified cyber insurance policies/products.

In various embodiments, the technology identifies computing assets' (e.g., computers, servers, mobile devices, databases, storage technology, cloud infrastructure, network appliances, intrusion detection systems (IDSs), firewalls, etc.) vulnerabilities that may be used in a cyber attack for exploiting resources (e.g., consumer data, such as credit card numbers) stored in or accessible to a company's network(s). Vulnerabilities are identified using various network security audit standards and technologies, such as the Payment Card Industry Data Security Standard (PCI DSS), other standard(s) and/or one or more penetration tests for analyzing assets for various vulnerabilities that may be exploited via internal and/or external cyber attacks. Security audits, in some embodiments, determine the feasibility of a particular set of real and/or potential attack vectors, identify higher-risk vulnerabilities that result from a combination of lower-risk vulnerabilities exploited in a particular sequence, assess the magnitude of potential business and operational impacts of successful attacks, test the ability of network defenders (e.g., security personal, firewalls, IDSs, etc.) to successfully detect and respond to the cyber attacks, and provide evidence to support increased investments in technology and insurance. Damage values are assigned to tangible (e.g., theft of credit card numbers) and/or intangible (e.g., reputation) losses associated with an occurrence of one or more cyber-attacks which could successfully exploit an assets' software and/or hardware vulnerabilities.

For example, the technology can determine that an asset storing trade secrets and credit card information has a higher economic damage value than a value associated with a redundant publically accessible webserver. Damage values are, in various embodiments, adjusted based on various damage indicators, such as the complexity and/or sophistication required to execute an exploit, availability of an exploit, a likelihood of the occurrence a cyber-attack, and/or likelihood of success of a cyber-attack. For example, an asset storing trade secrets can have an increased damage value if the asset is vulnerable to, e.g., more than one exploit, less complex exploits, and/or widely known exploits. Based at least on a damage value associated with an asset, the technology, in some embodiments, is configured to dynamically determine an amount of insurance for sufficiently insuring against the occurrence of the cyber-attack. In various embodiments, the technology automatically and periodically performs real-time security audits to continuously or semi-continuously reassess a company's vulnerability to new cyber threats and dynamically determine new damage values and, in response, corresponding new recommendations for insurance coverage.

In some embodiments, the technology is a computer program product or service, a device or a system configured with program code for receiving real-time data indicative of cyber attacks that are likely to diminish a value of the product or service. For example, the technology can leverage various databases, websites, the darknet, bit torrents, and/or other networks and data sources for determining known exploits and/or generate new or modify versions of known exploits. The program code is configured to process real-time data to compute a real-time damage assessment associated with losses for an occurrence of one or more cyber attacks. For example, the damage assessment can be computed using a likelihood of the occurrence of the one or more cyber attacks, a likelihood of success of the one or more cyber attacks, and a measure of severity of damage to the product or service as a result of the occurrence of the one or more cyber attacks. The program code, in various embodiments, is configured with technology that determines an insurability rating for the product or service for insuring against the cyber attacks. The insurability rating is usable for determination of an amount of insurance that sufficiently insures against the occurrence of the one or more cyber attacks, at least in-part based on the real-time damage indicator and is changeable in response to changes in the received real-time data.

In various embodiments, the technology determines asset risk assessments, asset damage assessments, and customer risk assessments. Assessments are snapshots of real-time asset and/or company behavior based on various indicators and expressed as simple values, such as a number, percentage, hash, etc. Each asset, in one or more embodiments, is associated with one or more profiles or other data structures ("profiles") that are associated with indicators that define asset and/or company characteristics and are used by the technology as variables for calculating assessment value. For example and as further described below, the technology can determine that an asset (e.g., a server) has a risk assessment of 8 out of 10 (i.e., 0.8) based on various indicators in that asset's profile, such as being a public server (i.e., a first indicator) operating using an older operating system and/or other software products (i.e., a second indicator) that has known vulnerabilities (i.e., a third indicator). That asset (e.g., the server described above) is also, in one or more embodiments, associated with a damage assessment, which is a measure of a company's estimated loss of capital and/or intangible losses (e.g., loss due to an adverse effect to company reputation) if the asset were compromised by a cyber-attack. Similar to the determination of the risk assessment, a damage assessment for the server mentioned above could be, for example, 3 out of 10 (i.e., 0.3) because the server stores lower valued webpages and, if compromised, would not negatively affect the company's reputation. By determining respective snapshots associated with risk and damage, the technology can efficiently and quickly identify, in real-time, assets at most risk of being compromised, associated losses and, in response, recommend insurance policies based on a company's unique circumstance and preferences. In some embodiments, multiple risk assessments are combined into a single meta-value that represents some or all of a company's assessments (e.g., a company's subsidiaries, different departments, or portions of a network).

In some embodiments, a profile is referenced for determining a company risk assessment, i.e., the level of risk associated with a specific company based on, for example, various indicators such as an amount of capital the company is willing to invest in cyber insurance, its risk tolerance, the number of assets to insure, existing security measures (e.g., an implemented network operating center (NOC), staff, and/or disaster recovery protocols), whether the company is high profile, the company's business, any history of attacks and their success, etc. Company risk profiles are automatically and/or manually determined and, in various embodiments, include a company's threshold tolerance for preventing and/or insuring against a determined level of financial loss (e.g., up to $2 million USD) as a result of the occurrence of the cyber-attack on an asset.

In one more embodiments, based on one or more indicators of the asset risk profile, asset damage profile, and/or company risk profile, the technology determines one or more insurance policies/products specific to the company. In various embodiments, the technology continuously, or on a schedule, updates the profiles based on changes to the assets or company (e.g., a new asset is added or an asset is recommissioned, critical data is moved, new vulnerabilities are discovered, etc.). In response to the changes to one or more of the profiles, the technology dynamically and automatically determines a new policy tailored to the changed profiles. This feedback technique allows the company to efficiently and comprehensively understand, in real time, where it has vulnerabilities and how best to insure against losses.

Referring to FIG. 1, an exemplary embodiment of the described technology employs a computer 100, such as a personal computer or workstation, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices, etc.). The computer 100 may be coupled to external computers, such as via an optional network connection 110, a wireless transceiver 112, or both.

The input devices 102 may include a keyboard, a pointing device such as a mouse, and described technology for receiving human voice, touch, and/or sight (e.g., a microphone, a touch screen, and/or smart glasses). Other input devices are possible such as a joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Figure 2:
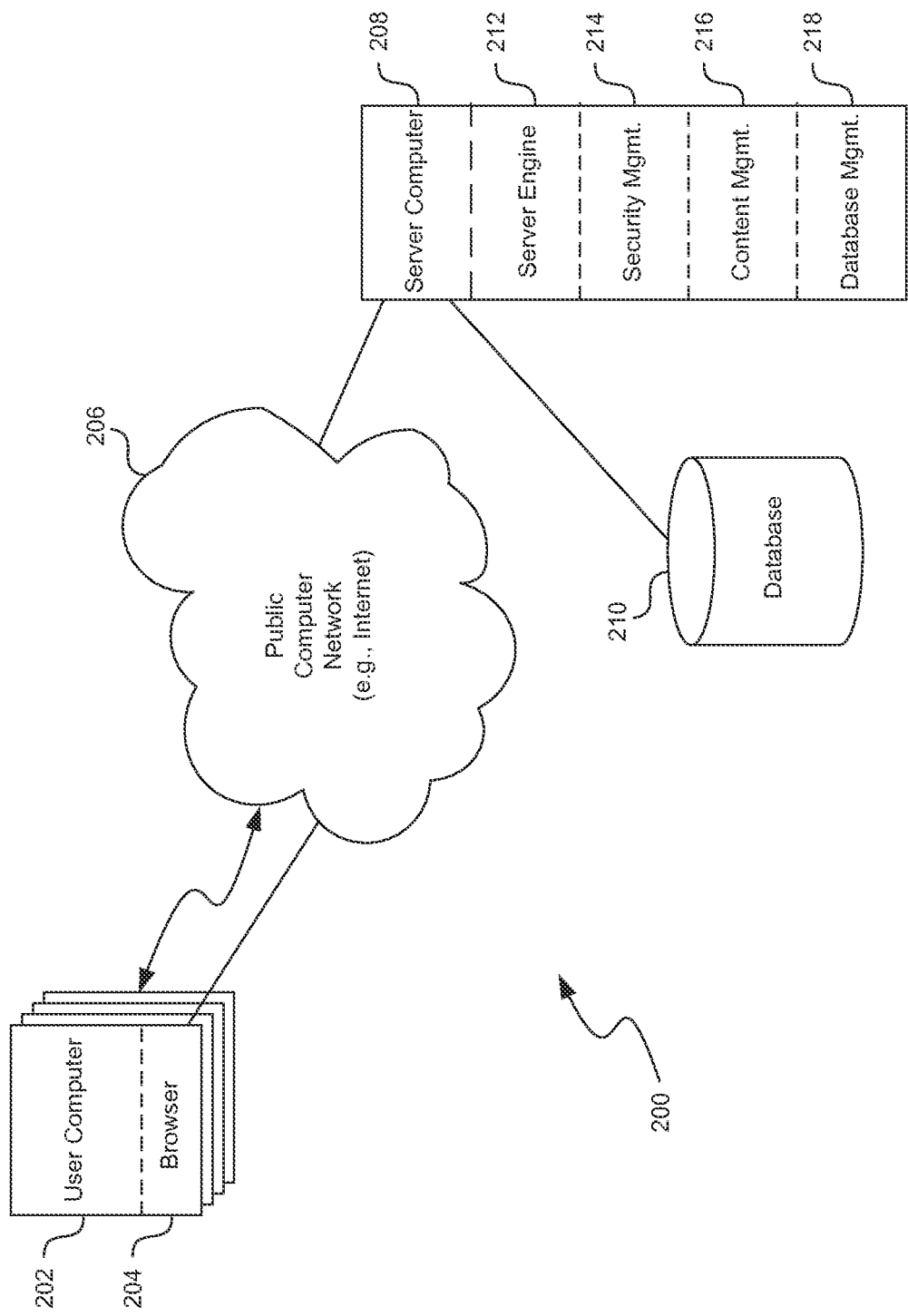
FIG. 2. is a block diagram illustrating a simple, yet suitable system in which aspects of the described technology may operate in a networked computer environment.

Aspects of the described technology may be practiced in a variety of other computing environments. For example, referring to FIG. 2, a distributed computing environment with a network interface includes one or more user computers 202 (e.g., mobile devices, desktops, servers, etc.) in a system 200, each of which can include a graphical user interface (GUI) program component (e.g., a thin client component) 204 that permits the user computer 202 to access and exchange data, such as network and/or security data, with a network 206 such as a LAN or the Internet, including web sites, ftp sites, live feeds, and data repositories within a portion of the network 206. The user computers 202 may be substantially similar to the computer described above with respect to FIG. 1. The user computers 202 may be personal computers (PCs) or mobile devices, such as laptops, mobile phones, or tablets. The user computers 202 may connect to the network 206 wirelessly or through the use of a wired connection. Wireless connectivity may include any forms of wireless technology, such as a radio access technology used in wireless LANs or mobile standards such as 2G/3G/4G/LTE. The user computers 202 may include other program components, such as a filter component, an operating system, one or more application programs (e.g., security applications, word processing applications, spreadsheet applications, or Internet-enabled applications), and the like. The user computers 202 may be general-purpose devices that can be programmed to run various types of applications, or they may be single-purpose devices optimized or limited to a particular function or class of functions. More importantly, any application program for providing a graphical user interface to users may be employed, as described in detail below. For example, a mobile application or "app" has been contemplated, such as one used in Apple's® iPhone® or iPad® products, Microsoft® products, Nokia® products, or Android®-based products.

At least one server computer 208, coupled to the network 206, performs some or all of the functions for receiving, routing, and storing of electronic messages, such as security data, web pages, audio signals, electronic images, and/or other data. While the Internet is shown, a private network, such as an intranet, may be preferred in some applications. The network may have a client-server architecture, in which a computer is dedicated to serving other client computers, or it may have other architectures, such as a peer-to-peer, in which one or more computers serve simultaneously as servers and clients. A database or databases 210, coupled to the server computer(s), store some content (e.g., security-related data) exchanged between the user computers; however, content may be stored in a flat or semi-structured file that is local to or remote of the server computer 208. The server computer(s), including the database(s), may employ security measures to inhibit malicious attacks on the system and to preserve the integrity of the messages and data stored therein (e.g., firewall systems, secure socket layers (SSL), password protection schemes, encryption, and the like).

The server computer 208 may include a server engine 212, a security management component 214, an insurance management component 216, and a database management component 218. The server engine 212 performs basic processing and operating system level tasks. The security management component(s) 214 handle creation, streaming, processing and/or routing of networking and/or security data. Security management components 214, in various embodiments, includes other components and/or technology, such as an asset risk component, asset damage component, company risk component and/or other components and/or assessment technologies, described below. Users may access the server computer 208 by means of a network path associated therewith. The insurance management component 216 handles processes and technologies that support the collection, managing, and publishing of insurance and/or cyber-related data and information, and other data. The database management component 218 includes storage and retrieval tasks with respect to the database, queries to the database, and storage of data. In some embodiments, multiple server computers 208 each having one or more of the components 212-218 may be utilized. In general, the user computer 202 receives data input by the user and transmits such input data to the server computer 208. The server computer 208 then queries the database 210, retrieves requested pages, performs computations and/or provides output data back to the user computer 202, typically for visual display to the user. Additionally, or alternatively, the user computers 202 may automatically, and/or based on user computers' 202 settings/preferences, receive various information, such as alerts, updates, cyber security assessments, cyber security programs, etc., from the server computer 208.

FIG. 3A illustrates one example of an asset risk profile 302. An asset risk profile 302 includes various asset descriptions 304a-304n each having one or more indicators 306 for defining attributes which may affect that asset's risk assessment 308 (e.g., whether the asset has a high, medium, or low risk rating). For example, Asset A 304a includes various indicators 306, such as the physical location of the asset, software operating on the asset (e.g., a version of an operating system, such as a Windows 8®), known vulnerabilities (e.g., a virus or rootkit active on the asset), unknown or future vulnerabilities (e.g., a yet to be released exploit that is programmed for the asset's operating system), etc. As an additional example, an asset risk profile 302 may specify various risk indicators descriptive of the asset's hardware (e.g., an Intel-based server, 1 Terabyte Western Digital hard drive, vendor-specific network interface card (NIC)), and/or software/services (e.g., a command shell with super user privileges)), etc. The technology can determine, at least based on one or more risk assessments 308 (e.g., a value determined via the technology's implementation of a weighted-value-based algorithm or other algorithm), a representative multiple of the risk indicators 306. For example, the technology can determine that an asset with an old version of an operating system having known vulnerabilities running moderately easy to hack NIC drivers has a high risk assessment value (e.g., 0.95) and a modern, recently updated asset has a lower risk assessment value (e.g., 0.15).

Risk indicators 306 can define virtually any type of information that may affect an asset's exploitation and values of risk indicators 306 are specific to an asset. In other words, different assets, e.g., Asset B 304b and Asset n 304n, can have different indicators and/or types of indicators than the indicators 306 associated with Asset A 304a. As mentioned above, risk indicators 306 are used by the technology, in one or more embodiments, to determine a risk assessment 308, based on one or more predetermined algorithms. The risk assessment 308 is a snapshot of real-time risk to an asset (e.g., Asset A 304a) based on the indicators 306 that, in some embodiments, are being continuously or semi-continuously updated via new or continuing security assessments of the company's network. In other words, as assets change (e.g., an asset's operating system is updated) a new risk assessment 308 is automatically and/or manually determined.

FIG. 3B illustrates one example of an asset damage profile 312 for an asset (e.g., Asset 304a). Asset damage profile 312 is associated with damage indicators 316 for each of a company's assets (e.g., Asset 304a-304n), which may indicate a potential loss (i.e., a tangible or intangible loss) to a company if the asset (e.g., Asset 304a) were compromised by a cyber attack. For example, Asset 304a, discussed above in reference to asset risk profile 302, includes various damage indicators 316 for determining, by the technology, a damage assessment 318, based on one or more predetermined algorithms. Damage indicators 316 include virtually any information and any type of information that may affect a loss to a company if the asset (e.g., Asset 304a) is compromised and can include, for example, a data type indicator representative of the data being stored (e.g., credit cards, trade secrets or webpages), hardware cost indicator (e.g., the cost of purchasing new hardware), down time loss indicator, loss indicator associated with company reputation (e.g., public and/or shareholders), etc. The damage assessment 318 is a snapshot of real-time damage to a company (e.g., tangible and intangible losses) if a particular asset (e.g., Asset A 304a) were to be compromised. In some embodiments, similar to the feedback technique described for the asset risk profile 302, damage assessments 318 can be continuously or semi-continuously updated via new or continuing security assessments of the company's network. In other words, as the network changes (e.g., an asset, such as Asset 304a, switches from storing financial security information to storing publicly available emails address) a new damage assessment 308 is determined automatically and/or manually for that asset (e.g., Asset 304a).

FIG. 3C illustrates one example of a company risk profile 322 for defining various company attributes and/or preferences, based on one or more various company indicators 326. The technology, in one or more embodiments, references a company's (e.g., Company A 324a, Company B 324b, and/or Company n 324n) indicators 326 for determining a company's general risk, based on factors other than indicators 328, which are specific to a particular asset (e.g., Asset A 304*a*). For example, the technology determines a risk assessment 320 for the company based on various company indicator's 326 unique to that company, such as the company's public exposure, profits, global reach, investments, line(s) of business, number and sophistication of employees/customers/clients, existing security measures implemented by the company, total number of potentially exploitable assets, history of cyber attacks, etc. Other indicators, such as company's level of tolerance of a cyber attack and the company's capital investment commitment for insuring against cyber-attacks are used by the technology in determining one or more insurance policies/products tailored to the company's situation and preferences.

Figure 4:
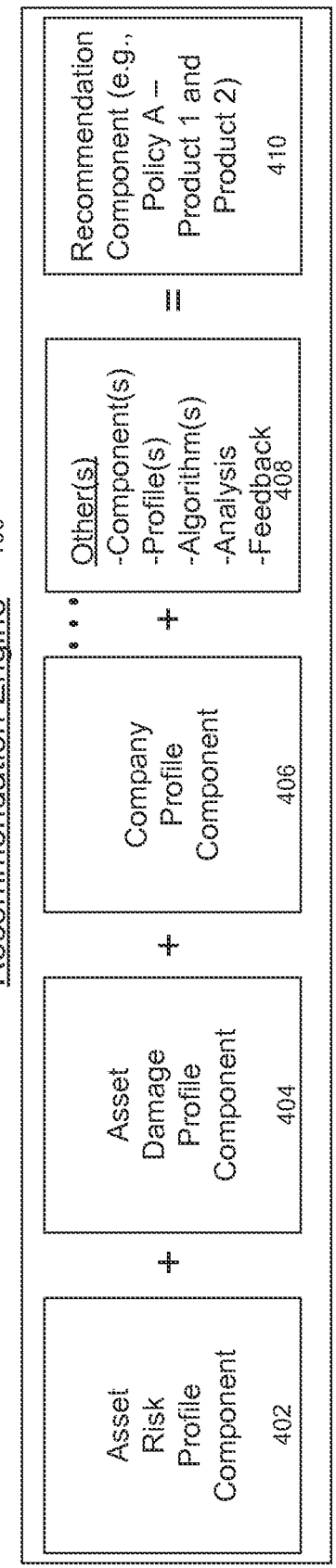
FIG. 4 illustrates a block diagram of an exemplary device that can be implemented as part of the disclosed devices and systems.

FIG. 4 illustrates one example of an engine 400 used by the technology to determine and/or recommend to a company one or more cyber insurance policies tailored to that company's asset, damage and/or company profiles. Engine 400 includes various components 402-410, such as an asset risk profile component 402, an asset damage profile component 404, and a company risk profile component 406 and other optional component(s) 408 (e.g., other profiles, algorithms, analysis, feedback, etc.) for determining, by recommendation component 410, one or more cyber insurance polices (e.g., a policy that includes cyber insurance Products 1 and 2). As referenced in the illustration for FIG. 4, the technology determines and/or recommends one or more insurance policies and/or products based on features of one or more of the asset risk profile 302 (e.g., a risk assessment 308 and/or risk indicators 306), asset damage profile 312 (e.g., damage assessment 318 and/or damage indicators 316) and company risk profile 322 (e.g., company risk assessment 328 and/or company indicators 326). Based on the one or more features of components 402-408, the technology determines and/or recommends cyber insurance policies/products by, for example, referencing a database or other data storing insurance information (e.g., premium, coverage amounts/percentages, terms, etc.) and calculating, via the recommendation component 410, preferred policies/products for the company's specific requirements and preferences.

One aspect of the disclosed technology relates to a computer-implemented cyber attack assessment method that includes identifying one or more software vulnerabilities for exploiting resources on one or more computing devices, assigning a damage value associated with tangible and intangible losses for an occurrence of one or more cyber attacks exploiting the one or more software vulnerabilities, and dynamically determining an amount of insurance for sufficiently insuring against the occurrence of the one or more cyber attacks exploiting the one or more software vulnerabilities, wherein the amount of insurance is at least based on the damage value. In some embodiments, such a method further includes periodically determining a new amount of insurance based on identifying one or more new software vulnerabilities for exploiting resources on the one or more computing devices.

In another aspect of the technology, a computer-readable storage device stores instructions that, upon execution by a processor of a computing system, cause the computing system to perform a method for insuring against cyber attacks within a network. The method includes determining an asset profile for a target asset, and assigning a risk rating to the target asset, wherein the risk rating is a measure of: (a) vulnerability of the target asset to a present or future cyber attack and (b) a cost associated with an occurrence of the cyber attack on the target asset. Such a method further includes identifying a customer risk profile associated with preventing the occurrence of the cyber attack on the target asset, and dynamically determining one or more financial instruments for insuring against the occurrence of the cyber attacked on the target asset, based at least on the risk rating and the customer risk profile.

In some embodiments, the asset profile includes characteristics descriptive of software products and data installed on the target asset. In some embodiments, the customer risk profile includes a threshold tolerance for preventing a determined level of financial loss as a result of the occurrence of the cyber attack on the target asset. In some embodiments, the one or more financial instruments insure against the occurrence of the cyber attack based on the determined level of financial loss. In some embodiments, the above noted method further includes dynamically and periodically determining one or more new vulnerabilities and, in response to determining the one or more new vulnerabilities, assigning a new risk rating and determining one or more new financial instruments for insuring against an occurrence of a new cyber attack based on the one or more new vulnerabilities.

Figure 5:
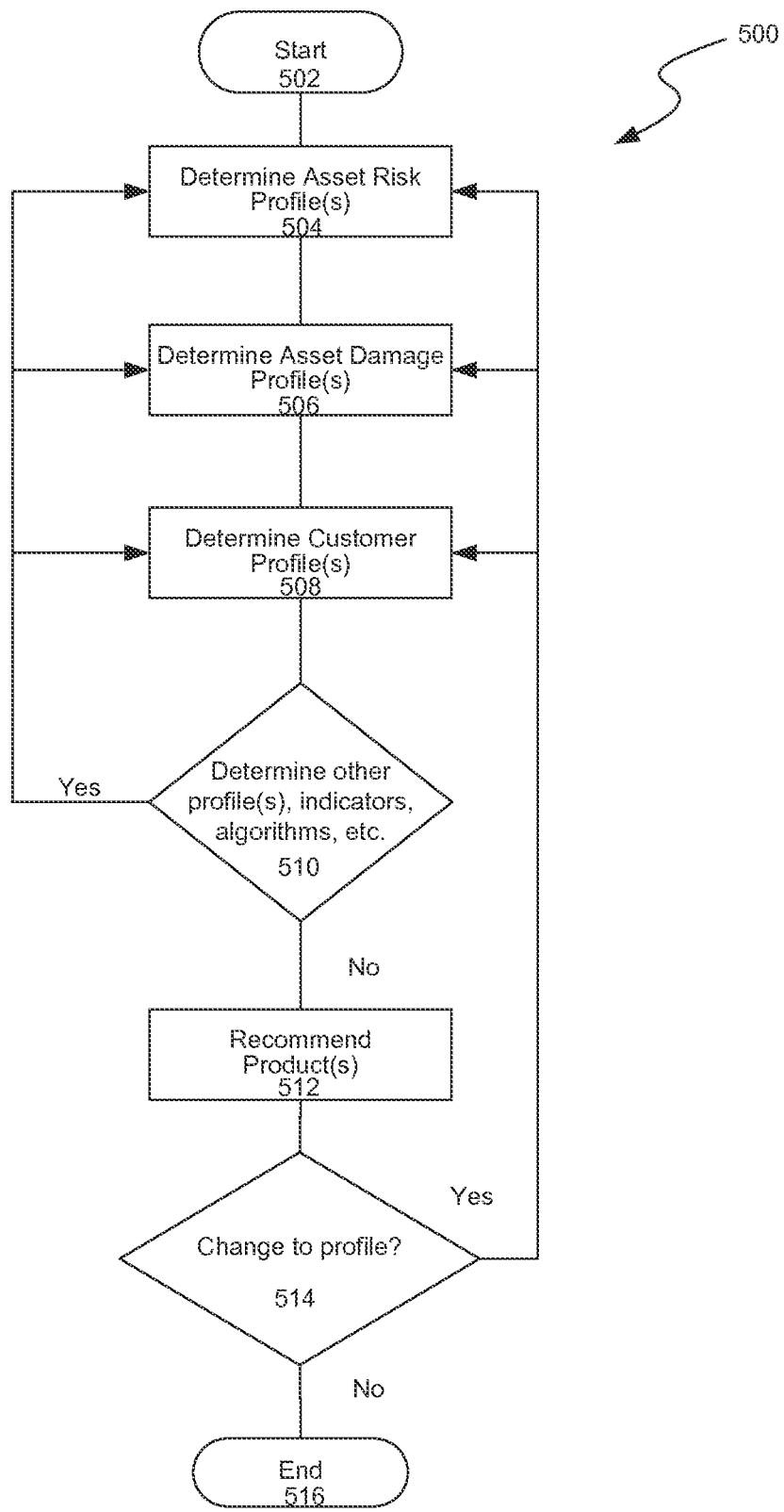
FIG. 5 illustrates a flow diagram for determining cyber insurance based on various profiles in accordance with an exemplary embodiment.

FIG. 5 illustrates a flow diagram 500 for determining a company's risk of a cyber attack and recommending a cyber insurance policy based on the determined risk. The flow starts at 502 and, at 504, the technology determines (e.g., via a security assessment) a network's vulnerability to cyber-attacks and stores results of the assessment in a assets risk profile 302. At 506, the technology determines one or more asset damage profiles 312 for each of the one or more assets defined in the asset risk profile 302 and, at 508, in some embodiments, defines indicators in the customer risk profile 322. If there are additional profiles and/or indicators then, at 510, the flow returns to 504, 506, and/or 508. Otherwise, the flow continues to 512 where the technology determines and/or recommends one or more cyber insurance policies/products for insuring against the possibility of a cyber-attack, based on the results of operations at 504-508. At 514, if there has been a change to the assets and/or customer preferences, the flow returns to 504, 506, and/or 508. Otherwise, the flow ends at 516. Further description, embodiments and/or implementations of policies, indicators, and assessments may be found in reference to one or more of the remaining figures.

Figure 6:
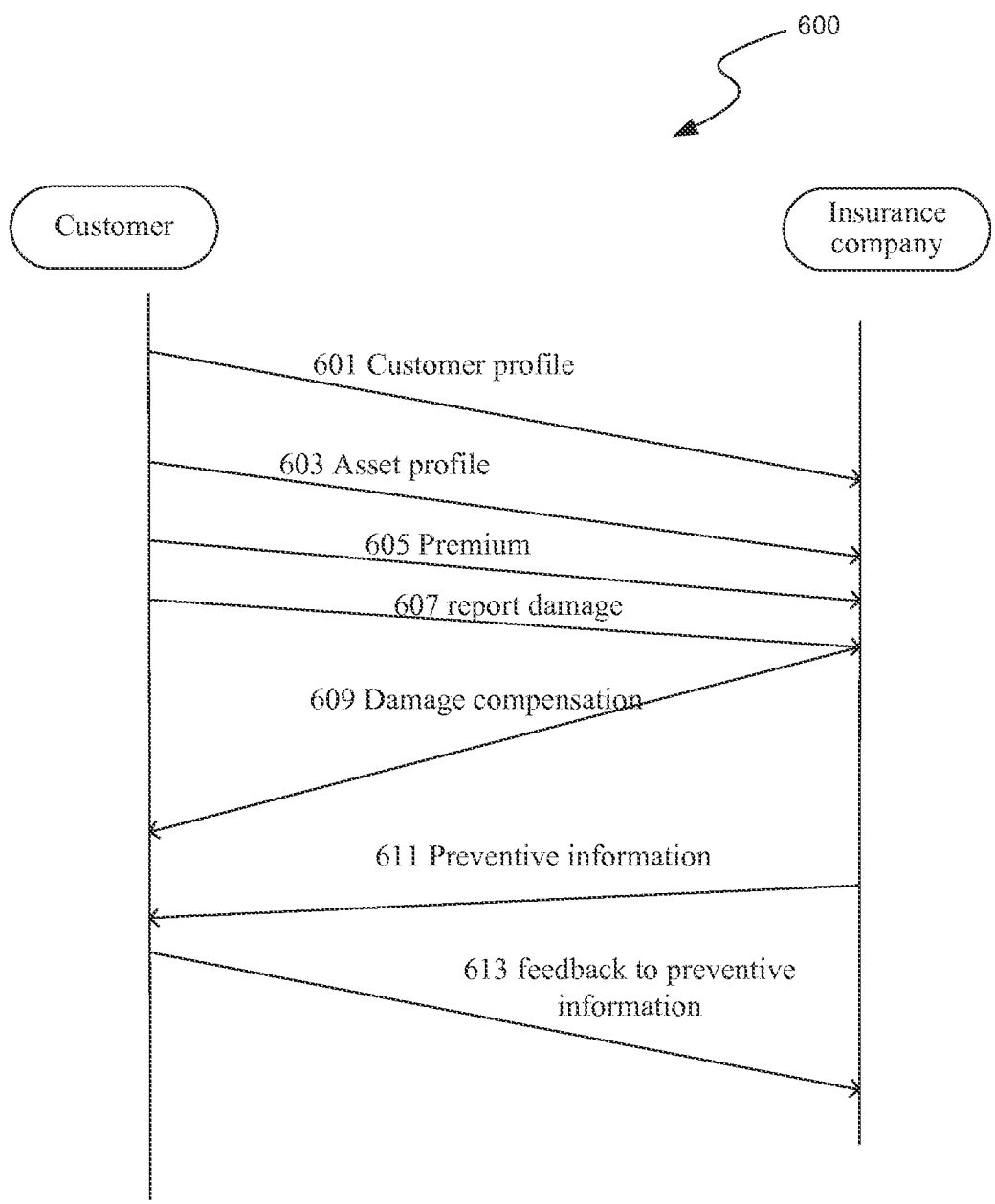
FIG. 6 illustrates a flow diagram of communications between a customer and an insurance company in accordance with an exemplary embodiment.

FIG. 6 illustrates a flow diagram 600 of communications between a customer/company ("customer") and an insurance company in accordance with an exemplary embodiment. At 601, a customer provides a customer profile to the insurance company. At 603, the customer provides an asset profile to the insurance company. At 605, the customer pays the premium to the insurance company to buy a policy. At 607, the customer reports certain damages to the insurance company. At 609, the insurance company pays the customer a damage compensation based on the policy that was purchased as part of operation 605. The insurance company may perform some verification and damage assessment before paying such damage compensation at 609.

The complexity of the computer related security threats makes it hard for small companies to have the most updated information and the skills needed to cope with the ongoing and increasing threats faced every day in the world. Computer security personal are highly skilled, hard to find, and highly paid. Therefore it is unrealistic for small companies to be able to maintain the most up to up-to-date defenses against the ever increasing attacks on computer assets. The insurance company, on the other hand, has to hire the highly skilled computer security personal to perform the security analysis, to keep updated with the most recent attacks with new methods. Therefore the insurance company can play a preventive role on behalf of many small companies by sharing the computer security expertise, developing defense guidelines, and distributing such defense guidelines and strategies among the insured companies. In this way, the insurance company can bear, or share with the small companies, the costs associated with combatting computer security threats while providing better defenses against new attacks.

Referring again to FIG. 6, at 611, the insurance company may distribute preventive information to the customer so that the customer can be aware of the most recent attacks and the associated techniques for defending against such attacks. At 613, the customer provides feedback based on the preventive information received from the insurance company, where the feedback may include the status report of the implementation results related to the preventive information distributed by the insurance company.

One aspect of the disclosed technology relates to determination of insurability of a product or service based on real-time cyber activity, which can lead to a determination of an insurance premium for the product or service. The insurability rating provides a measure as to insurability of the product or service. Examples of products or services include consumer data (e.g., credit card information, personal information) that is stored on a network-accessible storage unit, cloud computing resources that are provided to paying customers, social media services, financial information, financial services, and others. In the context of the disclosed examples, a high insurability rating is commensurate with having a product or service that is easily insurable (e.g., there is a lower risk of damage to the product or service), whereas a low insurability indicates that there is a higher risk of damage to the product or service. It is however, understood that such an inverse correlation between the insurability rating and damage risk is merely provided for the sake of illustration, and other relationships (e.g., direct correlation) can also be used. The insurability rating can be a number or a range of numbers. For instance, in one implementation, the insurability rating is a number between 0 and 100, whereas in another implementation, the insurability rating is represented by high (e.g., ratings in range 80 to 100), medium (e.g., ratings in range 60 to 79) and low (e.g., ratings in range 0 to 59).

Figure 7:
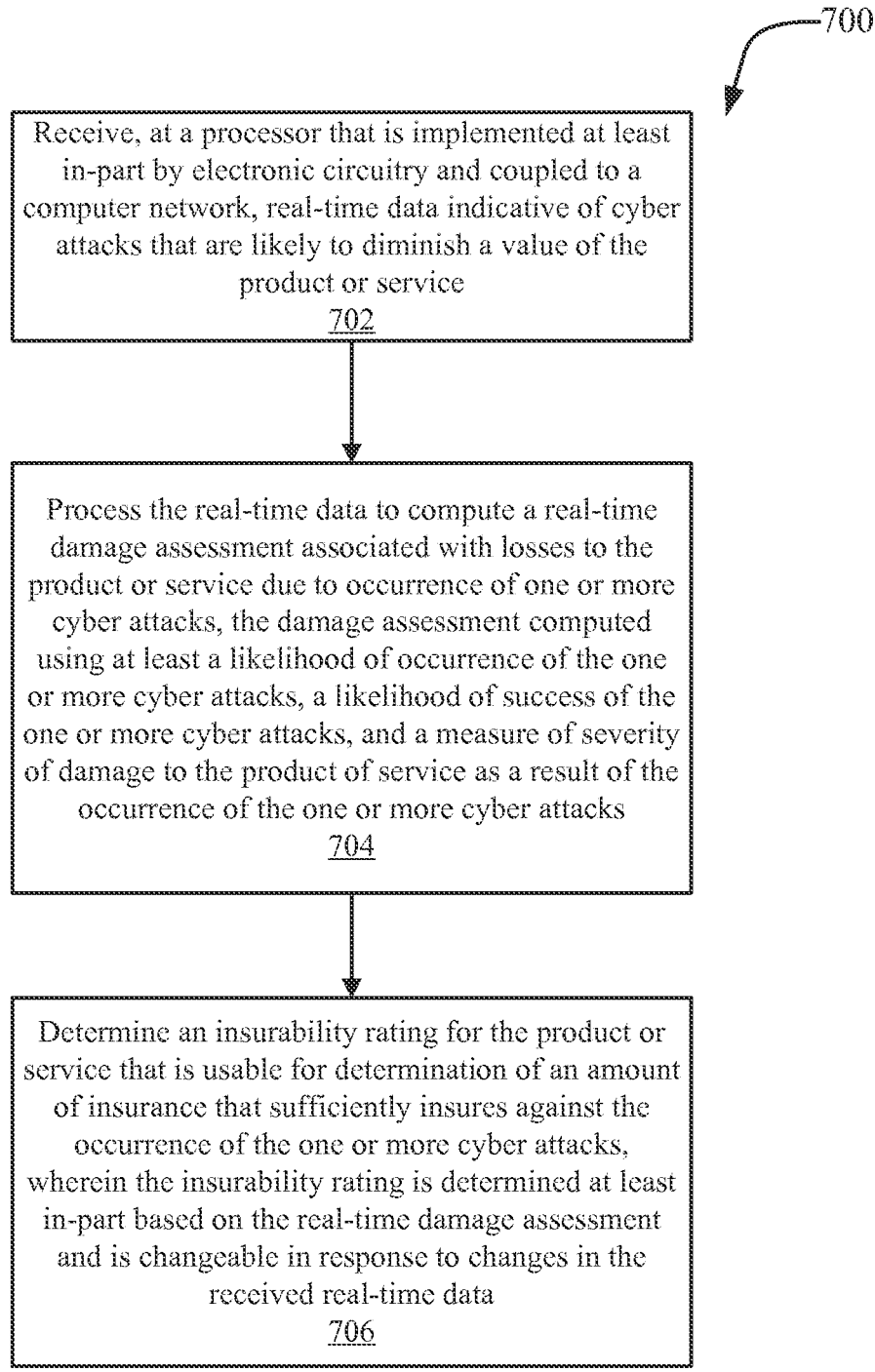
FIG. 7 illustrates a set of operations that can be carried out to determine an insurability rating for a product or a service in accordance with an exemplary embodiment.

FIG. 7 illustrates a set of operations 700 that can be carried out to determine insurability rating for a product or a service in accordance with an exemplary embodiment. The operations 700 can be implemented using a computing system with network connectivity. Such a computing system includes a processor (e.g., a hardware implemented processor comprising electronic circuitry), memory, physical buses and interfaces that allows different components of the system to communicate with one another and with other devices that are connected to the computing device through a network. Referring to FIG. 7, at 702, real-time data indicative of cyber attacks that are likely to diminish a value of the product or service is received at a processor that is implemented at least in-part by electronic circuitry and coupled to a computer network. At 704, the real-time data is processed to compute a real-time damage assessment associated with losses to the product or service in the event of one or more cyber attacks. The real-time damage assessment can be computed using at least a likelihood of occurrence of the one or more cyber attacks, a likelihood of success of the one or more cyber attacks, and a measure of severity of damage to the product of service as a result of the occurrence of the one or more cyber attacks. For example, a higher likelihood of cyber attack, a higher likelihood of the success of the cyber attack, and a higher severity measure of damage caused by such cyber attacks, each contribute to a higher computed real-time damage assessment.

Referring again to FIG. 7, at 706, an insurability rating for the product or service is determined. Such an insurability rating can be used to determine an amount of insurance that sufficiently insures against the occurrence of the one or more cyber attacks. The insurability rating is determined at least in-part based on the real-time damage assessment and is changeable in response to changes in the received real-time data.

The insurability rating can be used to produce an insurance premium value for the product or service. Such an insurance premium can also be affected by other factors, such as the length of relationship between the insurer and the organization or person that is seeking insurance (the "insured"), the insurance premiums offered by other insurers, existence of other insurance polices for the product or service, discounts based on the number of other products or services that are insured by the same insurer, and other factors.

One of the advantages of the disclosed technology relates to the use of real-time data that allows dynamic and up-to-date computation of the damage assessment based on cyber activities that are being continuously monitored. For instance, in one exemplary implementation, the real-time damage assessment is computed on an on-going basis based on changes in the real-time data with a time granularity of 1 micro second or less. Thus, through, for example, monitoring world-wide attacks on particular assets or organizations, the damage assessment can be updated almost instantaneously to allow certain mitigating actions to be triggered. A number or a range of numbers can represent the damage assessment. For instance, in one implementation, the damage assessment is a number between 0 and 100, whereas in another implementation, the damage assessment is represented by a set of three numbers indicative of high (e.g., ratings in range 80 to 100), medium (e.g., ratings in range 60 to 79) and low (e.g., ratings in range 0 to 59) values of the real-time damage assessment.

In one implementation, the real-time damage assessment is computed by an algorithm that uses a weighted average technique. This technique assigns a first weight to an indicator representative of a likelihood of the occurrence of the one or more cyber attacks, assigns a second weight to an indicator representative of a the likelihood of success of the one or more cyber attacks, and a third weight to an indicator representative of the measure of severity of damage to the product of service. The weights can be indicative of the importance of each of the associated indicators of likelihood and/or measure. Further, each of the likelihood of the occurrence of the one or more cyber attacks, the likelihood of success of the one or more cyber attacks, and the measure of severity of damage to the product of service can be determined using historical information associated with previously launched cyber attacks against the products or the service.

The historical information is typically obtained based on attacks, damages and success rates of previous cyber attacks. For example, the historical information can include a number of previous cyber attacks against the product or service, a rate of success of previous cyber attacks against the product or service, an amount of damage to the service or product caused by the previous cyber attack(s), or a frequency of occurrence of cyber attacks against other entities that offer products or services that are similar to the product and service. In one example, the damage caused by breach of financial data at one financial instruction is used to produce a measure of damage for another financial institution. The disclosed technology enables the likelihood of a cyber attack to be produced by analyzing the patterns of cyber activity over a large number of data networks, which can all be carried out in real-time as those evolve over time.

The damage assessment can be used to compute the insurability rating. In one example, computation of the insurability rating includes processing the real-time damage assessment over a pre-determined time interval and then determining a statistical value associated with several of the insurability rating values over that pre-determined time interval. An example of the statistical value is an average of several insurability rating values over the pre-determined time interval. In one variation, the statistical value is a weighted average of the plurality of insurability rating values over the pre-determined time interval. In this scenario, the weights can be assigned or determined using different techniques that would allow easy adaptation and correlation to the changes in the real-time data. For example, in computing the average value, insurability rating values that correspond to later time instances within the predetermined time interval are given a larger weight compared to the insurability rating values that correspond to earlier time instances within the predetermined time interval.

The choice of the pre-determined time interval is often left to the designer of the system and can be based on system capabilities and recourses, observed time-dependence of cyber activity patterns, importance of the product or service, and other factors. For example, the time interval can be set to be one hour, one day, one week or one month. The pre-determined time interval can also be set to an initial value, and can then be changed based on changes in the system resources, cyber activity patterns, customer requests, or other factors. It should be noted that in some instances it might be beneficial to compute more than one insurability rating so as to ascertain a trend in insurability rating over time, or for other reasons that facilitate the determination of the proper premium. For example, both a short-term and a long-term insurability rating can be computed, with the short-term insurability rating spanning a time period in the range of, e.g., one hour to one day, and the long-term insurability corresponding to a time period that is, e.g., greater than one day and up to one month.

In some implementations, the insurability rating is determined based in-part on the existing cybersecurity countermeasures that are being deployed to protect computers, networks or storage units that participate in storage, production or distribution of the product or service. Examples of such cyber security countermeasures include firewalls, anti-virus software, system alerts, fail-safe measures that, for example, limit the amount of loss to the product or service (e.g., cash withdrawal limits), biometric authorization protections and others administrative or physical security measures. In some implementations, the insurability rating is modified dynamically based on changes in cybersecurity countermeasures that are deployed to protect the assets. For example, upon a detection that deployed anti-virus software has expired or has become outdated, the insurability rating can correspondingly change to reflect a higher risk to the asset.

As noted in connection with operation 611 of FIG. 6, certain information and/or cyber security countermeasures can be shared with an insured party upon a determination that indicates an elevated cyber security risk. For example, one or more of the following can be shared with an entity that is interested in obtaining or maintaining insurance coverage for the product or service: information regarding the real-time damage, information regarding the likelihood of the occurrence of the one or more cyber attacks, information regarding the likelihood of success of the one or more cyber attacks, information regarding the measure of severity of damage to the product of service as a result of the occurrence of the one or more cyber attacks, a recommendation for obtaining additional cybersecurity countermeasures, or a particular cybersecurity countermeasure.

Figure 8:
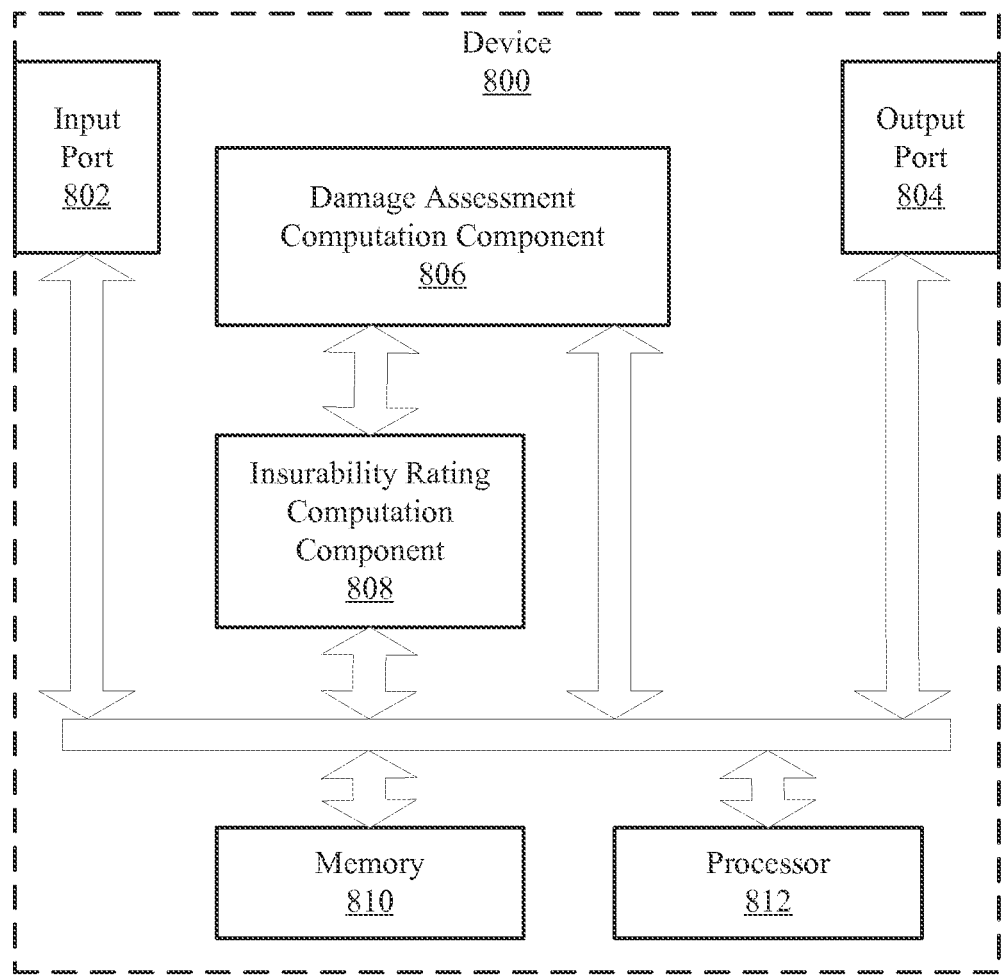
FIG. 8 illustrates some of the components of a device 1000 that can operate to produce an insurability rating in accordance with an exemplary embodiment

FIG. 8 illustrates some of the components of a device 800 that can operate to produce an insurability rating in accordance with an exemplary embodiment. The device 800 includes an input port 802 and an output port 804 that allow the device 800 to receive/send data, commands or other signal from/to an outside entity. For example, the input port 802 or the output port 804 can be a serial port, parallel port, a USB port, a wireless connectivity port, an Ethernet port, or other types of input/output ports that are known in the art. In some implementations, the input port 802 and output port 804 may be part of communication component that provide wired and/or wireless communication capabilities in accordance with one or more communication protocols, and therefore they may comprise the proper transmitter/receiver, antennas, circuitry and ports, as well as the encoding/decoding capabilities that may be necessary for proper transmission and/or reception of data and other information.

The device 800 in FIG. 8 also includes a processor 812 and memory 810 that are in communication with each other and with other components of the device through, for example, busses, optical interconnects, wireless connections or other means of connectivity that allow the exchange of data and control signals. The processor 812 can, for example, be a microprocessor, a controller or other processing device that is known in the art. The memory 810 can be used to permanently or temporarily (e.g., as in a buffer) store data, program code, parameters or other information that can be used to configure and/or operate the device 800 or the components therein. The device 800 also includes a damage assessment computation component 806, which is coupled to the input port 802 and is configured to receive data on an on-going basis (e.g., real-time data indicative of cyber activity) and compute a real-time damage assessment associated with losses to the product or service in the event of one or more cyber attacks.

The damage assessment computation component 806 can include sub-components (not shown) that parse the data received from the input port 802 or other device components, and route the appropriate data to other subcomponents (not shown) of the damage assessment computation component 806. For example, a routing subcomponent (not shown) can sift the incoming data to identify and route the following types of data to an aggregation subcomponent: data indicative of a likelihood of the occurrence of the one or more cyber attacks, data a likelihood of success of the one or more cyber attacks, and data indicative of a measure of severity of damage to the product of service as a result of the occurrence of the one or more cyber attacks. The damage assessment computation component 806 can also include one or more subcomponents (e.g., an aggregation subcomponent) that are configured to assign weights, compute averages, and modify data to determine a damage assessment value or values.

The device 800 also includes an insurability rating computation component 808 that is coupled to the damage assessment computation component 806 and is configured to receive a damage assessment value or values and to determine an insurability rating for the product or service that is usable for determination of an amount of insurance that sufficiently insures against the occurrence of the one or more cyber attacks. The insurability rating computation component 808 is configured to receive the damage assessment values on a real-time basis and use them to produce and update insurability ratings in response to changes in the real-time data. The insurability rating computation component 808 can also include subcomponent (not shown) that are configured to assign weights, compute averages, and modify data to determine the insurability rating. The insurability ratings can be communicated to outside components (not shown) using the output port 804. Examples of those outside components include a monitor, a storage device (e.g., RAM, Optical or Magnetic disks, etc.), a printer and a networked computing device.

It should be noted that to avoid clutter, FIG. 8 might not show all of the components of the device 800, or all connections between the device components. For example, in instances where data compression is used to reduce the storage and transmission bandwidth of data that is received and processed by device 800, the device 800 may include components that are configures to decompress and decompress the data based on the specific compression/decompression algorithms (e.g., LZV, Run Length Encoding, PKZip, etc.). Similarly, in instances where data encryption is used to ensure the security of data (e.g., for the external data received by the device 800, data transmitted by the device 800 to outside devices, or data stored in memory 810), the device 800 may include components that are configured to encrypt and decrypt the data based on specific algorithms (e.g., DES, 3DES, AES, RSA, etc.). In some embodiments, the processor 812 can execute program code that is stored memory (e.g., in a portion of memory 810) to carry out certain operations, such as data compression/decompression or data encryption/decryption.

The device 800 that is depicted in FIG. 8 is one example device that can be configured for generating insurability ratings for a product or service. Such a device includes a first input port coupled to a network communication channel to receive real-time data indicative of cyber attacks that are likely to diminish a value of the product or service. The device also includes a damage assessment computation component that is implemented at least in-part using electronic circuits. The damage assessment computation component is coupled to the first input port to receive the real-time data and compute a real-time damage assessment measure associated with losses to the product or service due to occurrence of one or more cyber-attacks. The damage assessment is computed using at least a likelihood of occurrence of the one or more cyber attacks, a likelihood of success of the one or more cyber attacks, and a measure of severity of damage to the product of service as a result of the occurrence of the one or more cyber attack. The device also includes an insurability rating computation component that is implemented at least in-part using electronic circuits and coupled to the damage assessment computation component. The insurability rating computation component is configured to receive the real-time damage indictor computed by the damage assessment computation component and to determine an insurability rating for the product or service that is usable for determination of an amount of insurance that sufficiently insures against the occurrence of the one or more cyber attacks. The insurability rating is determined at least in-part based on the real-time damage assessment and is changeable in response to changes in the received real-time data.

The components or modules that are described in connection with the disclosed embodiments can be implemented as hardware, software, or combinations thereof. For example, a hardware implementation can include discrete analog and/or digital circuits that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Figure 9:
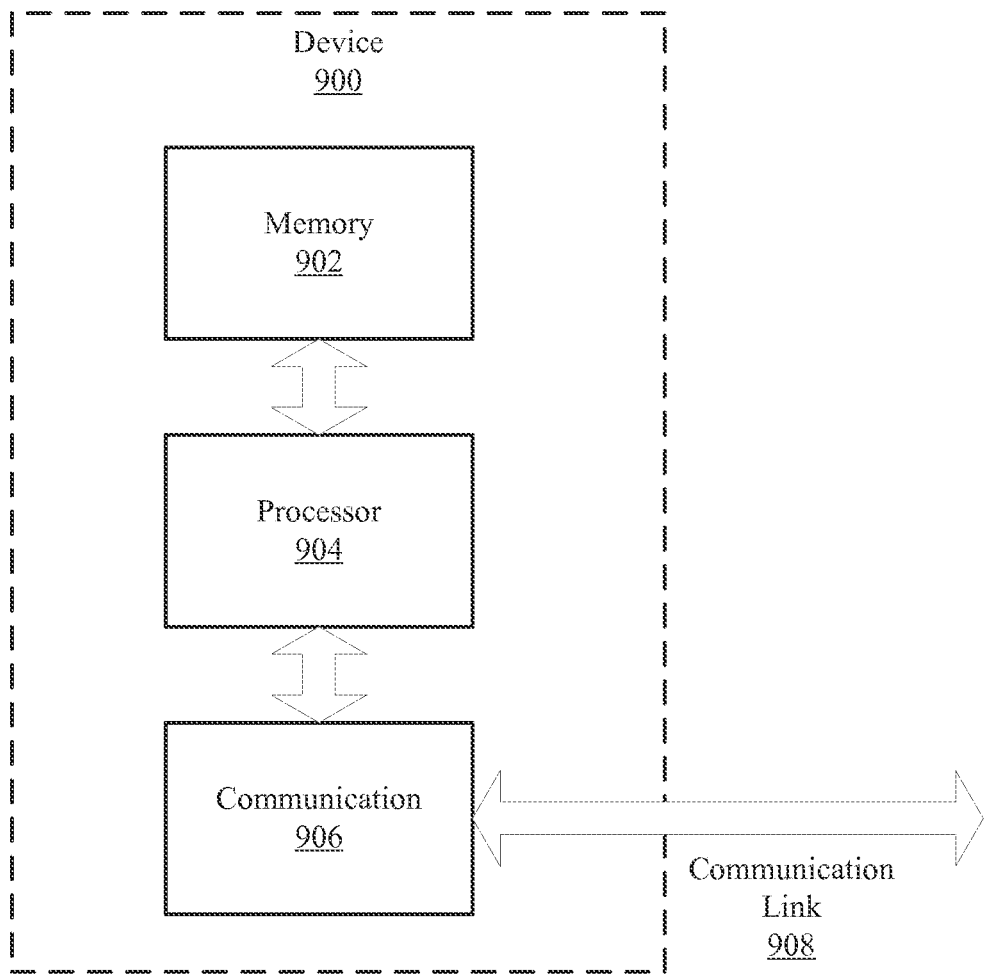
FIG. 9 illustrates a block diagram of a device that can be implemented as part of the disclosed devices and systems.

FIG. 9 illustrates a block diagram of a device 900 that can be implemented as part of the disclosed devices and systems. The device 900 comprises at least one processor 904 and/or controller, at least one memory 902 unit that is in communication with the processor 904, and at least one communication unit 906 that enables the exchange of data and information, directly or indirectly, through the communication link 908 with other entities, devices, databases and networks. The communication unit 906 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 900 of FIG. 9 may be integrated as part of any devices or components to perform any of the disclosed methods.

Some embodiments of the disclosed technology relate to methods, devices and computer programs that facilitate monitoring and responding to cyberattacks. For example, in some embodiments, a consortium system for a monitoring consortium of monitoring companies and an infrastructure including one or more central monitoring stations or local handling stations for a monitoring company are provided. In some embodiments, a central monitoring station of a monitoring company detects a cyberattack to a client computer system. The central monitoring station then requests a local handling station to handle the cyberattack via onsite visits or requests additional resources from other monitoring companies through the consortium system of the monitoring consortium. The central monitoring station also sends to the consortium system updates on a cyberattack that is detected or handled by a central monitoring station or local handling station of the monitoring company. The consortium system pools data received from the central monitoring stations of member monitoring companies, provides summaries and observations to help recognize pending cyberattacks and prevent future cyberattacks, and also organizes the pooled data for further analysis by the members. The consortium also coordinates the handling of cyberattacks with resources from all the members.

By virtue of these features, each monitoring company offers dedicated computing and human resources to its client computer systems for immediate and skilled detection, handling, and prevention of cyberattacks. The monitoring consortium enables stronger capabilities than any individual monitoring company can offer by the combination and coordination of the efforts and resources of the members. Clients therefore enjoy a superior level of security for their computer systems, which maximizes the confidentiality, integrity, and availability of their data and business operations and minimizes their waste of resources and mental pain and suffering.

Aspects, embodiments and implementations of the consortium system for the monitoring consortium and the infrastructure for each monitoring company will be described in the general context of computer-executable instructions, such as routines executed by a general-purpose computer, a personal computer, a server, or other computing systems. In some embodiments, each of the disclosed systems is embodied in a special-purpose computer or data processor that is specifically programmed, configured, or constructed to perform one or more of the computer executable instructions explained in detail herein.

Figure 10:
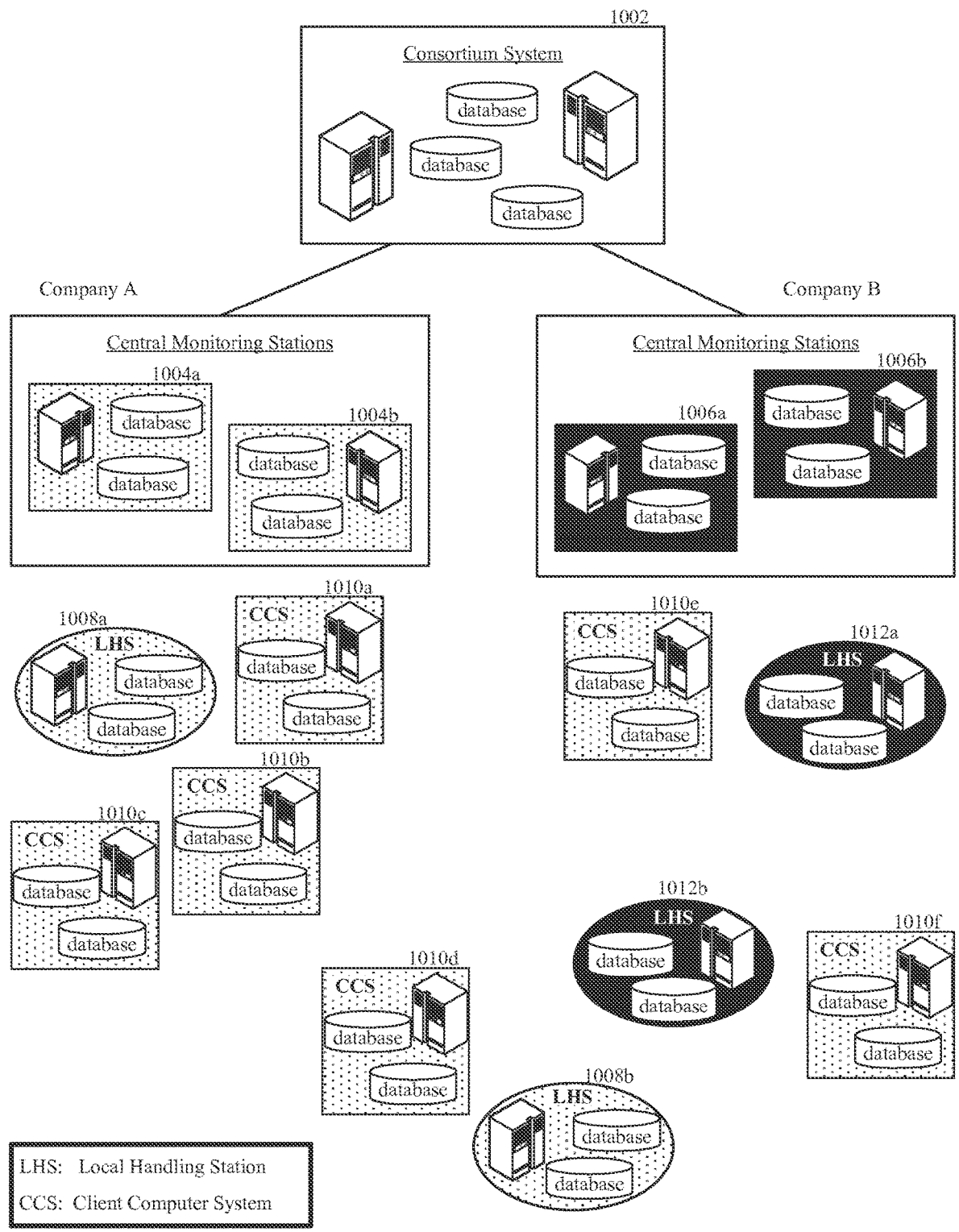
FIG. 10 illustrates an example computing environment in which a consortium system of a monitoring consortium and central monitoring stations and local handling stations of associated monitoring companies can operate.

FIG. 10 illustrates an example computing environment in which a consortium system of a monitoring consortium and central monitoring stations and local handling stations of associated monitoring companies can operate. In some embodiments, a monitoring consortium system manages the joint efforts of multiple monitoring companies. It includes a consortium system 1002 having servers and databases with strong computation and storage power, as well as networking and communication capabilities. In this example, the monitoring consortium has at least two members, namely company A and company B.

In some embodiments, each monitoring company has its clients in various locations, each with a computer system to be monitored (a "client computer system"). The client computer system can range from a single computer to an enterprise platform comprising different types of computers interconnected by different types of networks. In this example, company A has its client computer systems 1010a-1010f, and company B has its client computer systems that are not shown. Each monitoring company also includes one or more central monitoring stations, which monitor the client computer systems for suspicious online activities and actual cyberattacks. Each central monitoring station can be conveniently located according to business needs, such as in a central, metropolitan area or near the company headquarter. Each central monitoring station includes servers and databases with strong computation and storage power as well as networking and communication capabilities. Each central monitoring station is typically connected to each of the client computer systems through computer networks, such as the Internet. All the central monitoring stations of the company are generally also connected to one another in a fault tolerance scheme so that when one fails, another one can immediately take over. In this example, company A has two central monitoring stations 1004a and 1004b, and company B has two monitoring stations 1006a and 1006b.

In some embodiments, each monitoring company can further include one or more local handling stations that provide onsite support for diagnosing and countering cyberattacks. Each local handling station can also include servers and databases for various computation, storage, and communication tasks. Each location handling station is typically connected to each of the central monitoring stations through computer networks, such as an intranet. Each local handling station is also typically connected to each of the client computer systems through computer networks, such as the Internet. In this example, company A has two local handling stations 1008a and 1008b, and company B has two local handling stations 1012a and 1012b.

In some embodiments, one of company A's central monitoring stations 1004a detects that the client computer system 1010a is under attack. The central monitoring station 1004a first notifies the client computer system 1010a as well as the consortium system 1002. Depending on the condition of the client computer system 1010a and the client preferences, the central monitoring station 1004a can alert the client through the client computer system 1010a, such as by displaying special messages on the screens, or through alternative means, such as by contacting key personnel for the client computer system 1010a on the phone. The central monitoring station 1004a can notify the consortium system in a variety of ways, such as by showing a pop-up on the screen or emailing a system administrator. In response to detecting the cyberattack, the central monitoring station 1004a can handle the cyberattack directly. Alternatively, the central monitoring station 1004a can request the local handling station 1008a, which is located near the client computer system 1010a, to handle the cyberattack. The local handling station 1008a then visits the client location and works directly with the client computer system 1010a.

In some embodiments, the central monitoring station 1004a detects that the client computer system 1010e is under attack. Realizing that company A doesn't have any local handling station near the client computer system 1010e, the central monitoring station 1004a can send a request to the consortium system 1002 for human resources. The central monitoring station 1004a determines that company B has a local handling station near the client computer system 1010e and informs one of company B's central monitoring stations 1006a of the need for human resources. The central monitoring station 1006a can then request the local handling station 1012a, which is located near the client computer system 1010e, to handle the attack. The local handling station 1012a then visits the client location and works directly with the client computer system 1010e.

In some embodiments, regardless of which monitoring company handles the cyberattack, the handling result is reported back to the consortium system 1002, which can then record the handling result into a database accessible to all the members. Such pooling of data can raise each member's awareness of present and future cyberattacks. It can also enable effective analysis of the nature of known and potential cyberattacks and attackers, thereby increasing each member's preparedness for future cyberattacks.

Figure 11A:
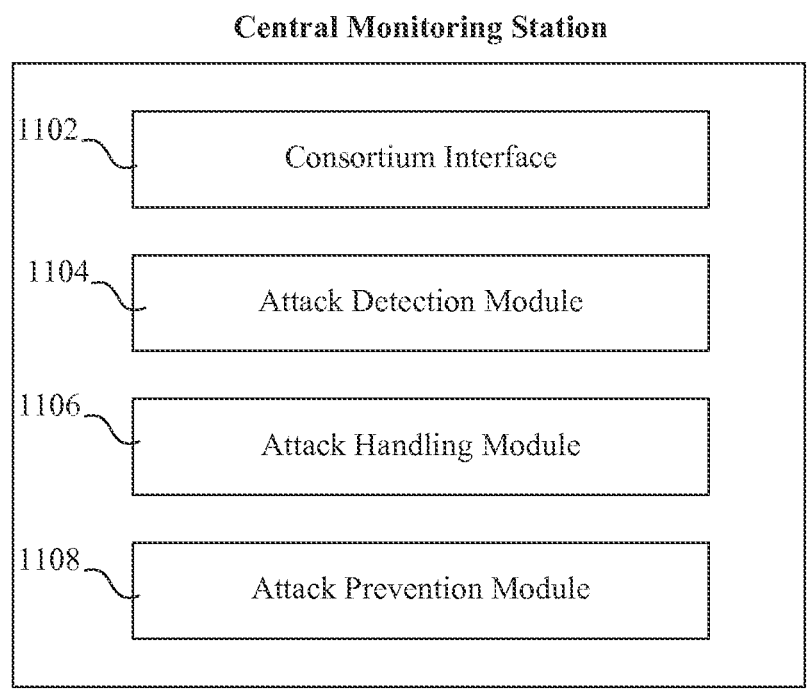
FIG. 11A illustrates components of a central monitoring station of a monitoring company in accordance with an exemplary embodiment.

FIG. 11A illustrates example components of a central monitoring station of a monitoring company. It should be noted that while FIGS. 11A and 11B labels indicate various modules of the central monitoring station and consortium system, these modules can are also sometime referred to as components. As noted earlier, these modules or components can be implemented as hardware, software, or combinations thereof. In some embodiments, the central monitoring station comprises a consortium interface 1102, an attack detection module 1104, an attack handling module 1106, and an attack prevention module 1108. The consortium interface 1102 manages communications with the consortium system. The communications can include reporting a cyberattack, receiving information regarding a cyberattack, requesting computing or human resources for handling a cyberattack, receiving a confirmation of an allocation of requested resources, and so on.

In some embodiments, the attack detection module 1104 monitors each of the client computer systems and detects threats and occurrences of cyberattacks. The detection can utilize one or more detection methods. So far, cyberattacks have normally been perpetrated automatically by computer viruses, worms, and other malware (including Trojan horses) or manually by human users. Each piece of malware can be characterized in various ways and identified accordingly. For example, it can be identified by the entirety of it contents, by a signature of its contents, by the way it normally infects a computer, by its typical output, and so on. Each malicious user can also be characterized in various ways and identified accordingly, such as from the user's account and data access patterns. In general, for characterizations of malware and malicious users, the attack detection module 1104 can utilize a repository maintained by the consortium system or additionally maintain a local database, which it can synchronize with the repository. The attack detection module 1104 can then constantly scan system data and activity logs and identify matches of characterizations of malware and malicious users as threats of cyberattacks. The attack detection module 1104 can access a client computer system remotely, or it can deploy a client component to the client computer system and rely on the client component for part or all of the detection work.

In some embodiments, the attack handling module 1106 stops and remedies the cyberattack directly or sends a request to one of the local handling stations, which then stops and remedies the attack. Cyberattacks generally violate the confidentiality, integrity, and availability of data. To handle a cyberattack, the attack handling module 1106 can process the information related to the attack to identify the source of the cyberattack, remove the source, and/or revert the effects of the cyberattack when possible. The attack detection module 1104 may have identified the source of the cyberattack, whether it is a piece of malware or a malicious user, or it may have recognized certain characterizations of the source. In the latter case, the attack handling module 1106 attempts to identify the source by further scanning the files and logs on the client computer system or by other methods. The attack handling module 1106 then manages to eliminate any malware and related copies or to restrict or terminate access of any malicious users. The attack handling module 1106 can also trigger that removal any data produced and recover any data modified or deleted by the source during the cyberattack. This process can require system reboots and disaster recovery as well as user cooperation.

In some embodiments, the attack prevention module 1108 identifies and implements preventive measures for future cyberattacks. During or after a cyberattack, the attack prevention module 1108 examines available data related to the cyberattack that it has gathered directly or received from the consortium system to strengthen its attack detection and handling capabilities or to prepare recommendations for the client computer system that was under attack. As one example, the attack prevention module 1108 can increase its communication with the consortium system for earlier awareness of potential cyberattacks and attackers. As another example, the attack prevention module 1108 can recommend to the client computer system stronger authentication and encryption mechanisms that have been developed by other members of the monitoring consortium. As yet another example, the attack prevention module 1108 can recommend to the monitoring company the addition of a local handling station for an area where the monitoring company has a number of client computer systems but no member of the monitoring consortium has a local handling station nearby.

Figure 11B:
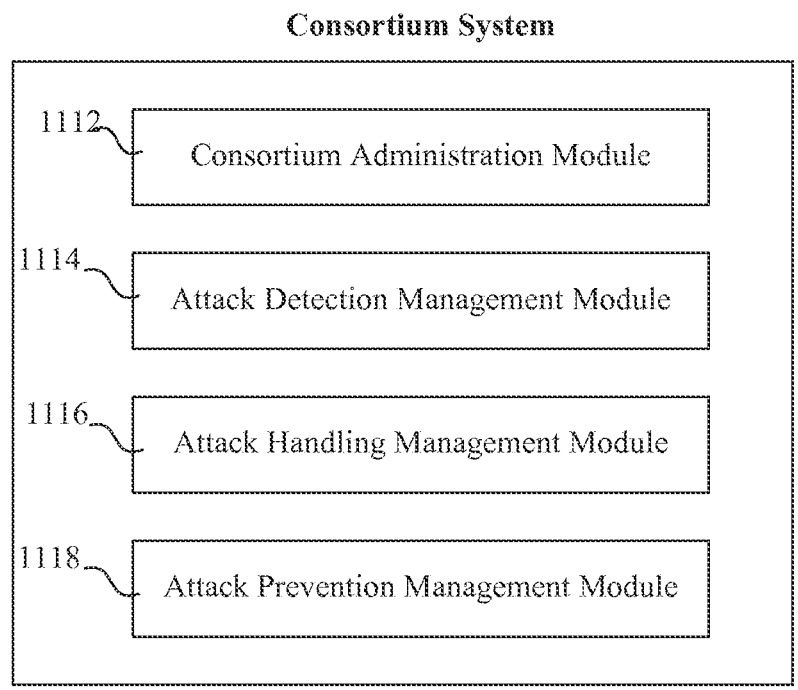
FIG. 11B illustrates components of the consortium system of the monitoring consortium in accordance with an exemplary embodiment.

FIG. 11B illustrates example components of the consortium system of the monitoring consortium. In some embodiments, the consortium system comprises a consortium administration module 212, an attack detection management module 214, an attack handling management module 216, and an attack prevention module management 218. The consortium administration module 212 administers activities of the monitoring consortium, including member registration. The attack detection management module 214 manages the detection of a cyberattack. It receives notifications of cyberattacks from some members and alerts other members of pending cyberattacks. The attack handling management module 216 manages the handling of a cyberattack. It receives requests for computing or human resources from some members and seeks the requested resources from other members. The attack prevention management module 218 compiles and analyzes results of handling cyberattacks for better understanding of the cyberattacks and the attackers. It also makes raw and derived information regarding the cyberattacks and attackers available to the members to increase their preparedness for future cyberattacks.

Figure 12:
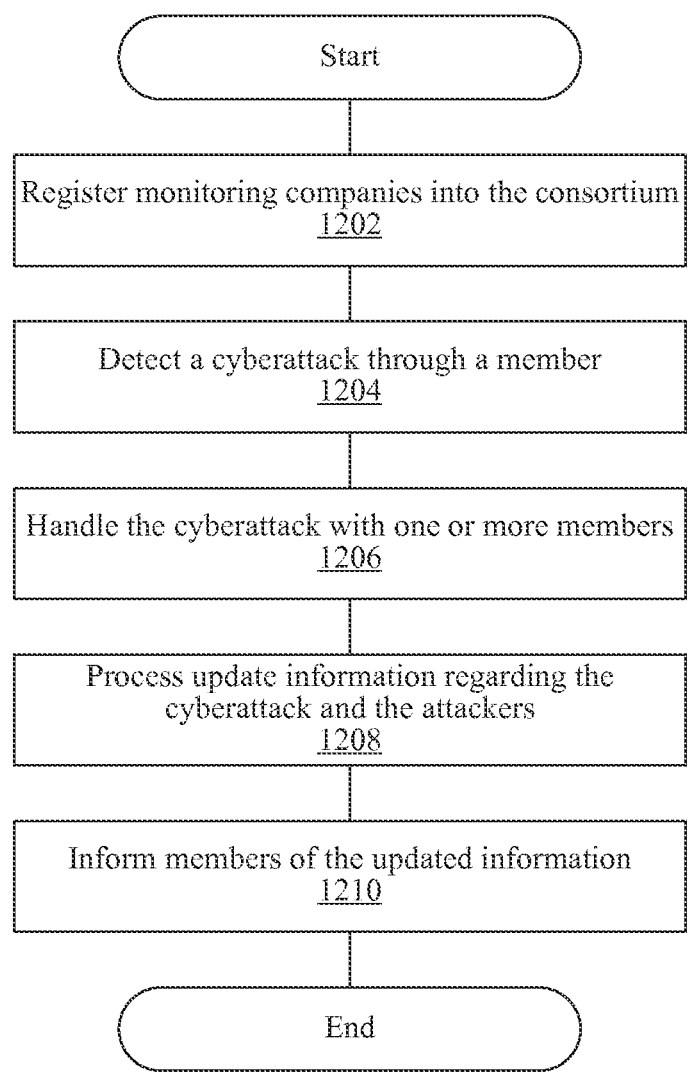
FIG. 12 illustrates a set of operations that can be performed by the consortium system of the monitoring consortium for managing communications with the central monitoring stations of member monitoring companies in accordance with an exemplary embodiment.

FIG. 12 illustrates a set of operations that can be performed by the consortium system of the monitoring consortium for managing communications with the central monitoring stations of member monitoring companies in accordance with an exemplary embodiment. At 1202, the consortium system receives registration requests from central monitoring stations of monitoring companies who would like join the monitoring consortium, and it sets up a profile for the member. At 1204, a cyber attack is detected by a first member. At 1206, the cyberattack is handled by one or more members of the consortium. At 1208, update information regarding the cyberattack and the attackers is processed. At 1210, the members of the consortium are informed about the updated information.

FIG. 13 illustrates a sample member profile corresponding to a registration request submitted by a central monitoring station to the consortium system in accordance with an exemplary embodiment. Each profile can include basic information 1302 regarding the monitoring company, such as the name, size, or headquarter location. The profile can include specific information 1304 regarding the client computer systems, such as how many of them there are, how they are spread geographically, or how they are distributed in different industries. The profile can also include details regarding each client computer system as appropriate. In addition, the profile can include specific information 1306 regarding each central monitoring station, such as the address, contact information, or level of computing power. The profile can also contain specific information 1308 regarding each local handling station, such as the location, main contact mechanism, hours of operation, level of computing power, number of specialists, or specialty areas (corresponding to types of cyberattack).

In some embodiments, besides providing static information, each member can indicate in the profile its preferences or commitments 1310 regarding disclosing information to the monitoring consortium. These preferences or commitments can be expressed as a binary "yes/no" value, in terms of specific points in time when information disclosure occurs, etc. The disclosed information can include updates 1314 regarding the monitoring company's structure and capabilities, in terms of the creation, termination, failure, or recovery of one of the central monitoring stations or local handling stations, or in terms of the increase or decrease of human, computational, or other resources at each of the existing stations. The disclosed information can include notifications or data 1314 regarding a new or pending cyberattack it is managing at different stages, including the suspicion of a cyberattack, detection of the cyberattack, and identification of the source of the cyberattack, removal of the source, containment of the effect, and restoration to a pre-attack state. The disclosed information can further include any analysis or intelligence 1318 that the member has created that can help prevent future cyberattacks. For each disclosure, the member can indicate whether to send a report to the monitoring consortium and what may be included in the report. Similarly, each member can also indicate in the profile preferences 1312 regarding receiving information from the monitoring consortium, when other members are managing cyberattacks for their own client computer systems or for the member's client computer systems in response to the member's request.

In some embodiments, in indicating these communication preferences or commitments, each member understands that upon receiving any information from one member, the consortium system determines whether to publish the information to all the members or to only the relevant members. For example, during the handling of a cyberattack by monitoring company A for monitoring company B, the consortium system can keep the communication between the two monitoring companies or release only limited information to the other members; but once the handling is complete, the consortium system can make all the relevant information available to the other members. Exact arrangements can be worked out between the consortium system and the members. Overall, the information included in the profile allows the consortium system to understand the capabilities of each monitoring company and determine how to allocate resources to improve the overall effectiveness of handling cyberattacks.

In some embodiments, the consortium system maintains various policies that include general guidelines and recommendations and outline duties and privileges of the members. The recommendations and duties can include providing updates actively and diligently, making a certain number of human resources available during specific timeframes, executing specific strategies for handling certain cyberattacks, and so on. The definition of these recommendations and duties can mean that certain actions are no longer a matter of member preference, such as when to send updates. Specifically, the recommendations can form defaults while still leaving choices to the members, while the duties would dictate what the members need to do.

In some embodiments, the privileges mainly concern the sharing of resources. Specifically, the consortium system sets up a repository that is accessible to each member. The repository can contain data regarding different types of cyberattacks, characterizations of known cyberattacks, attributes of known attackers, approaches of handling known cyberattacks, prediction of future cyberattacks, recommended strategies for handling future cyberattacks, and so on.

FIG. 14 illustrates example data in the repository maintained by the consortium system regarding a particular cyberattack. Such data can be recorded for each cyberattack that has occurred. The data can include basic information 1402 regarding the cyberattack, such as information identifying the source of the cyberattack (name, category, etc.), the time of the cyberattack, and the scope of the cyberattack. Additional information regarding the source of the attack can be stored in a separate database in the repository. The data can include information 1404 identifying each attacker (ID, location, etc.). Additional information regarding each attacker can be stored in a separate database in the repository. The data can include information 1406 identifying each target or affected client computer system (location, nature and scale of computing resources, etc.). Additional information regarding each affected client computer system can be stored in a separate database in the repository. Furthermore, the data can include information 1408 regarding the detection of the cyberattack, such as the method (program signature identification, login pattern analysis, etc.) or the timing (before the source of the attack produced any damage based on alerts from the consortium system, or afterwards). The data can also include information 1410 regarding the handling of the cyberattack, such as the method (document deletion, system reboot, etc.), the amount of onsite support required (none, various specialists, etc.), or the amount of member assistance required when the affected member did not have sufficient resources. Additional information regarding the detection and handling methods can be stored in a separate database in the repository.

The various policies governing the monitoring consortium, as discussed above, can also be included in the repository. Each member can decide when to receive updates from the repository, such as instantly, periodically, as needed, etc. Each member can also enjoy the benefit of additional computing or human resources from other members that it might not be able to provide at a certain point in time.

Referring back to FIG. 12, in some embodiments, at 1204, the consortium system becomes aware of a cyberattack through communication with a central monitoring station. At 1206, the consortium system assists in and coordinates the handling of the cyberattack with the central monitoring stations of one or more members. At 1208, the consortium system processes updates related to the cyberattack, such as information regarding the source of the cyberattack, the attacker, or the scope of impact. At 1210, the consortium system informs the members of the updates to ensure that all the members benefit from detection and handling of the cyberattack. Certain details regarding operations 1204-1210 are provided with respect to FIGS. 15-17.

Figure 15:
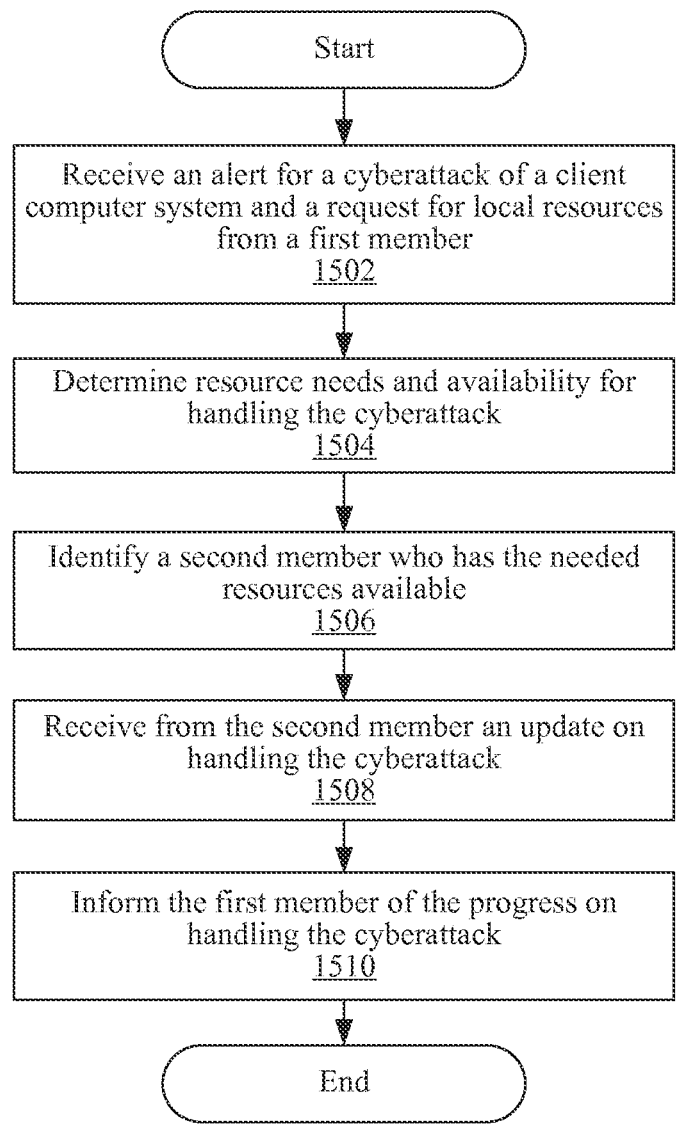
FIG. 15 illustrates a set of operations that can be performed by the consortium system of the monitoring consortium for detecting and handling a cyberattack in accordance with an exemplary embodiment.

FIG. 15 illustrates a set of operations performed by the consortium system of the monitoring consortium for detecting and handling a cyberattack in accordance with an exemplary embodiment. At 1502, the consortium system receives an alert for a potential or ongoing cyberattack to a client computer system of a client from a central monitoring station of a requesting member. The central monitoring station generally reports a cyberattack to the consortium system as soon as it detects a threat, although it can choose to report the cyberattack only when the threat turns into an actual attack or until it needs additional assistance from the consortium system.

In some embodiments, upon receiving the alert, the consortium system updates the repository with information included in the alert and identifies relevant information from the repository for delivery to the central monitoring station. For example, the relevant information can be regarding past or other pending cyberattacks having similar characteristics as the present cyberattack, affecting similar computer systems as the present cyberattack, and so on. The consortium system also assesses a scope of impact for the cyberattack. The assessment can be based on various factors, such as the nature of the cyberattack, the scale of the client computer system, and the scope of similar past or pending attacks. For example, when the cyberattack appears to be a fast-replicating virus that destroys files or affects a government server that services a large number of users, the scope of impact may potentially be large. Depending on the assessment result, the consortium system can forward the alert to one or more central monitoring stations of the other members at appropriate times. It may even forward the alert to local authorities or national security agencies depending on the estimated scope of impact.

In some embodiments, upon detecting a cyberattack to the client computer system, the central monitoring station may determine that the cyberattack can be handled remotely, but the monitoring company does not have sufficient computing capabilities to fully handle the attack at this time. Alternatively, the central monitoring station may determine that it would be necessary or helpful to have specialists physically work with the client computer system, but its local handling stations do not have enough specialists available. In these cases, the central monitoring station sends a request to the consortium system for necessary resources, possibly along with the initial report of the cyberattack.

Continuing with FIG. 15, when the consortium system receives the request from the central monitoring station, at 1504, the consortium system determines the nature of the resource need and an approach to satisfy the resource need. The determination of the nature of the resource need can be based on various factors, such as the type of the cyberattack, the estimated scope of impact of the cyberattack, the location and scale of the client computer system, or the preferences of the requesting member. As one example, when the client computer system comprises a large number of different types of computers interconnected with different types of networks, the consortium system can choose to solicit an appropriate number of human resources who specialize in working with these types of computers and networks. As another example, when another member has recently handled a similar cyberattack, the consortium system can send a request to a central monitoring station of that member for similar computational and human resources used to handle the recent cyberattack.

In some embodiments, to determine the approach to satisfy the resource need, the consortium system examines the data regarding the other members, including the member profiles and specifically regarding the availability of different types of resources, and identifies a monitoring company which can assist with handling the cyberattack. Depending on how often different monitoring companies send updates, as discussed above, the consortium system may need to send an inquiry to a monitoring company using the main contact mechanism, typically electronically to one of the central monitoring stations, to get updated information on the monitoring company's resource availability.

In FIG. 15, at 1506, the consortium system identifies a member (the "assisting member") or more that can satisfy the resource need. When the resource need involves electronic resources, the need can be satisfied by one or more central monitoring stations or local handling stations. When the resource need involves human resources, the need is typically satisfied by one or more local handling stations near the affected client computer system. The consortium system sends a request for additional resources to the assisting member using the main contact mechanism, typically electronically to one of its central monitoring stations. In response, the central monitoring station notifies one or more other central monitoring stations or local handling stations as appropriate, and the local handling station dispatch specialists to the client location as appropriate.

At 1508, the consortium system receives an update from the assisting member, typically electronically from one of the central monitoring stations. Depending on the governing policies and the assisting member's preferences, the assisting member can provide this update to the monitoring consortium at various points throughout the attacking handling process. At 1510, the consortium system forwards the update to the requesting member, typically electronically to one of its central monitoring stations. The consortium system can record the information included in each update in the repository. As it receives updates, the consortium system re-assesses the scope of impact of the cyberattack and makes adjustments in resource utilization and information reporting accordingly. For example, the consortium system can determine that the handling needs to be escalated and can in turn identify additional assisting members, report the cyberattack to national security agencies, and so on.

Figure 16:
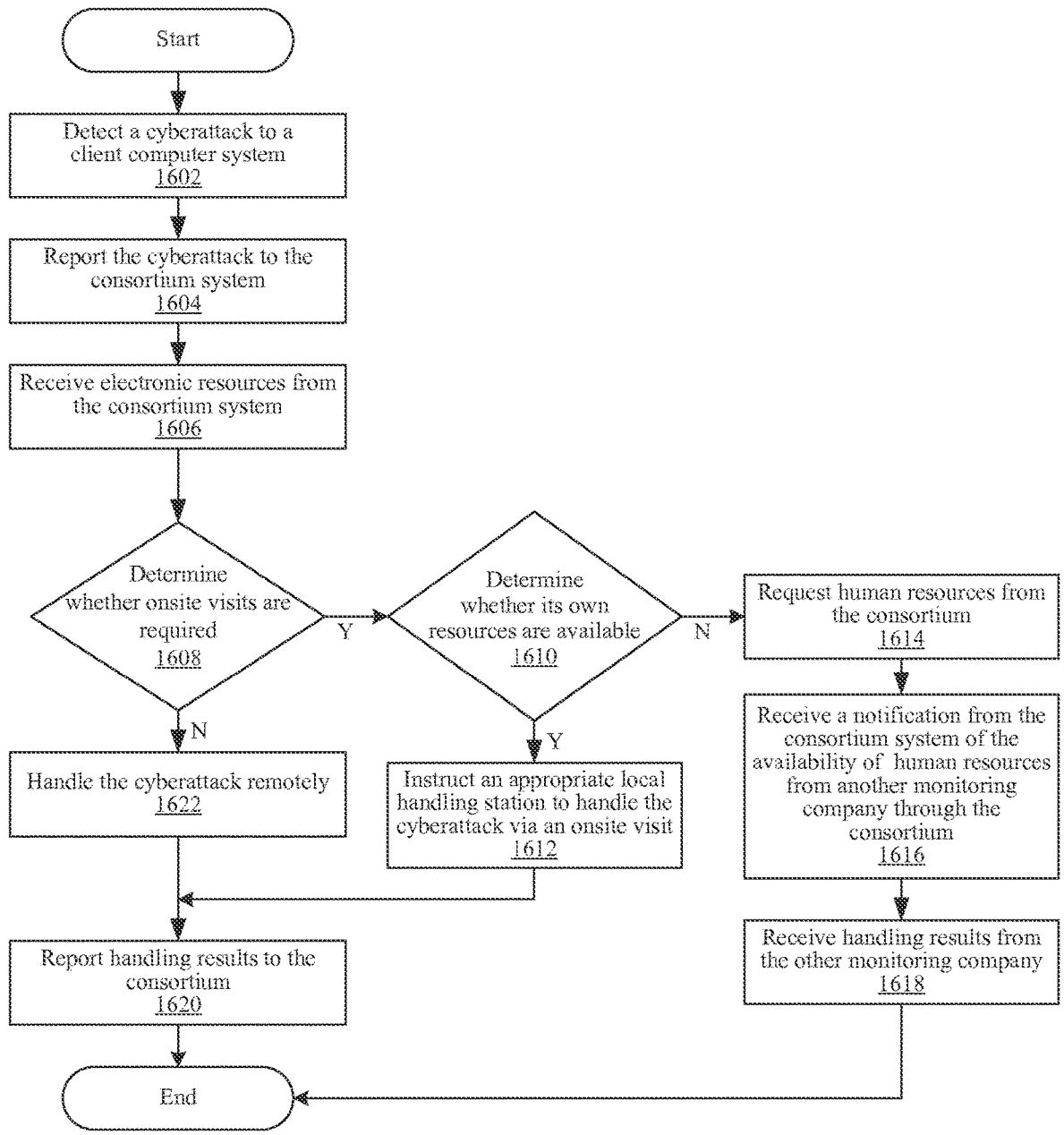
FIG. 16 illustrates a set of operations that can be performed by a central monitoring station of a monitoring company for detecting and handling a cyberattack in accordance with an exemplary embodiment.

FIG. 16 illustrates a set of operations that can be performed by a central monitoring station of a monitoring company for detecting and handling a cyberattack in accordance with an exemplary embodiment. At 1602, the central monitoring station detects a potential or pending cyberattack to a client computer system of a client. As one example, from the information available in the repository, the central monitoring station can learn about a new worm corresponding to a computer program having a certain name and size or producing a file of a certain name and size. During a daily scan, the central monitoring station can detect the presence of such programs or documents and thus deem them a threat. As another example, the central monitoring station can receive automatic alerts of excessive email delivery or excessive file storage and thus detect an ongoing cyberattack.

At 1604, the central monitoring station reports the cyberattack to the consortium system. Generally, early alerts increase the chance of early resolution, but the central monitoring station can postpone the reporting depending on the governing policies and other possible requirements. In response to reporting the cyberattack, in step 1606, the central monitoring station receives from the consortium system various electronic resources that can be helpful to handling the cyberattack. These electronic resources can include data specific to the type of the cyberattack, data regarding similar cyberattacks that occurred in the past, and so on.

At 1608, the central monitoring station determines whether onsite visits should be made to physically work with the client computer system. The determination can be based on the scope of impact of the cyberattack, the location, nature, the scale of the client computer system, the urgency of handling the cyberattack, and other relevant factors. For example, a client location's being near a local handling station, the computer system's being very complex, and the need to stop the damage of the cyberattack being urgent are all reasons for an onsite visit.

At 1610, when the determination result indicates that onsite visits should be made, the central monitoring station determines whether the monitoring company has sufficient human resources in the local handling stations for handling the cyberattack. The central monitoring station typically first considers those local handling stations near the client location to be able to start the handling process quickly. However, the central monitoring station can decide to rely on a local handling station that is not near the client location, and the central monitoring station or that local handling station can initially handle the cyberattack remotely until the specialists from that local handling station arrive onsite. Generally, the central monitoring station evaluates resource availability across all the local handling stations in determining whether sufficient human resources are available within the monitoring company.

At 1612, upon determining that sufficient human resources are available within the monitoring company and identifying one or more local handling stations for handling the cyberattack, the central monitoring station instructs the identified local handling stations to handle the cyberattack, which then send appropriate specialists to the client location to physically work with the client computer system. The central monitoring station maintains a communication channel with each of the local handling stations that handle the cyberattack to stay informed of the status of the attack handling. In step 1620, as the cyberattack is being handled, the central monitoring station can send a status update to the consortium system at various time points, such as when the cause of the cyberattack or the attacker behind the cyberattack is identified, when the effect of the cyberattack is contained, when the client computer system is fully recovered from the cyberattack, etc.

At 1614, upon determining that the monitoring company does not have sufficient human resources available at this time, the central monitoring station sends a request to the consortium system for available human resources. The request can indicate a number of specialists, areas of specialty, client location, and other relevant information. In response to the request, the consortium system evaluates the request with respect to resource availability within the monitoring consortium. In the case where the consortium system determines that no adequate human resources are available within the monitoring consortium, the consortium system can immediately notify local authorities or national security agencies for further assistance. Under normal circumstances, however, the monitoring consortium proceeds to identify any other monitoring company that can assist with handling the cyberattack and request that the identified monitoring company provide adequate human resources. Subsequently, at 1616, the central monitoring station receives a notification from the consortium system that the identified monitoring company is handling the cyberattack. The central monitoring station can forward this information to the client to prepare the client for working with the identified monitoring company. At 1618, the central monitoring station receives updates from the consortium system on attack handling at various time points, such as when the effect of the cyberattack is contained or when the client computer system is fully recovered from the cyberattack. In these cases, a central monitoring station of the identified monitoring company would report the progress on the attack handling to the consortium system.

When the determination result indicates that onsite visits do not need to be made, at 1622, the central monitoring station determines whether to handle the cyberattack directly or have one or more other central monitoring stations or local handling stations handle the cyberattack remotely. The determination can be based on the nature and extent of computing resources available at each of the stations, the nature of the cyberattack, the scope of impact, and other factors. The central monitoring station maintains a communication channel with each of the stations that handle the cyberattack to stay informed of the status of the attack handling. At 1620, the central monitoring station similarly reports the progress on the attack handling to the consortium system, as discussed above. The central monitoring station can also determine that the monitoring company does not have sufficient computing resources for handling the cyberattack and thus send a request to the consortium system for adequate computational resources. The rest of this process would be similar the operations conducted at 1614 through 1618.

Figure 17:
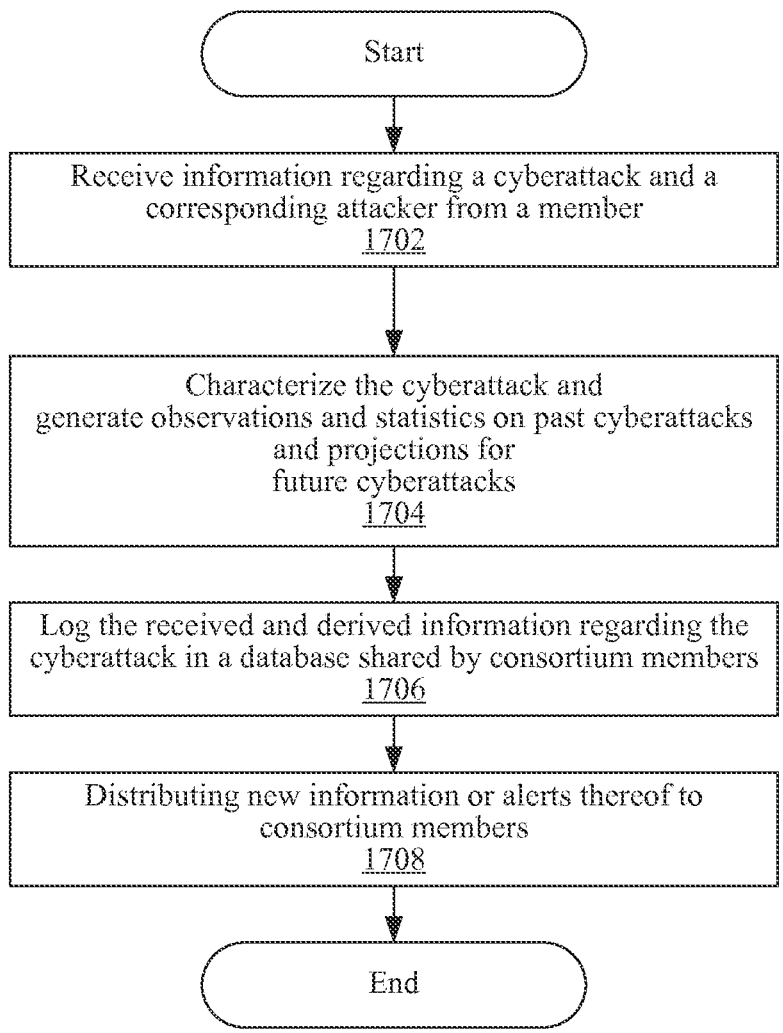
FIG. 17 illustrates a set of operations that can be performed by the consortium system of the monitoring consortium for preventing future cyberattacks in accordance with an exemplary embodiment.

FIG. 17 illustrates a set of operations that can be performed by the consortium system of the monitoring consortium for preventing future cyberattacks in accordance with an exemplary embodiment. At 1702, the consortium system receives information from a central monitoring station of a member monitoring company regarding a cyberattack. This monitoring company can be a member that initially detects the cyberattack or a member that actually handles the cyberattack. The information can indicate the time and mechanism of detecting the cyberattack, the nature and details of the cyberattack, the identity and origin of the attacker, the approach of handling the attack, and so on. At 1704, the consortium system examines the presently and previously received information to generate some observations or statistics regarding the recent and pending attacks. The observations or statistics can be on the scope and distribution of the geographical locations and industries of the targets, of the timing of the attacks, of the locations, skill levels, and motives of the attackers, of the types of attacks, of the approaches of conducting the attacks, of the approaches of detecting and handling the attacks, etc.

At 1706, the consortium system also records the received information as well as the generated observations and statistics in the repository to allow the members who are equipped with specialists and other experts in the field of cybersecurity to perform in-depth analysis. Each monitoring company can analyze the data in the repository to glean further insight into the cyberattacks and the attackers to better handle pending and future cyberattacks. The amount of accumulated data makes it likely to prepare a larger number and more specific virus or worm definitions, create a more extensive list of defects and loopholes in computer programs, compile a more detailed list of malicious users, zombies, or scam Internet domains, extract more extended or unique patterns of suspicious, unauthorized, or illegal online activities, etc. Any analysis results can in turn be reported to the consortium system and subsequently added into the repository to promote further analysis and lead to better prevention of cyberattacks.

At 1708, the consortium system ensures that relevant information regarding cyberattacks reaches the members in time. While the repository can generally be freely accessed by the members, the consortium proactively sends digests, summaries, various statistics, etc., to each member, tailored to the member's preferences. In addition, when the consortium system perceives any urgent need to share information, it can immediately make a broadcast to the potentially affected members. For example, when a virus spreads rapidly among specific target computer systems having catastrophic consequences, the consortium system would send a high-priority alert to potential targets immediately.

In one aspect of the disclosed technology, a computer implemented method for managing a consortium of monitoring systems is provided. Such a computer implemented method, which can detect and handle cyberattacks, includes registering each of a plurality of monitoring systems as a member in response to corresponding registration requests for becoming a member of the consortium of monitoring systems. Each of the monitoring systems is associated with a distinct, independent business entity and each of the monitoring systems comprises one or more central monitoring stations. Further, each of the central monitoring stations includes a processor and a memory and monitors one or more client computer systems for cyberattacks to the client computer systems. Each central monitoring station is also associated with one or more specialists who can physically work with the client computer system. Moreover, at least one of the monitoring systems includes one or more local handling stations. Such a method further includes receiving a report in electronic format from a first member coupled to a computer network, processing the electronic report to detect a cyberattack to a client computer system of the first member, and responding to the cyberattack with the first member and a second member, where the second member assigns computing or human resources for mitigating the cyberattack. According to this method, a repository of data related to cyberattacks accessible to members of the consortium is also updated.

In one exemplary embodiment, the registering of the monitoring stations includes generating a profile in electronic format for the requesting monitoring system. The profile includes information on computing and human resources associated with the monitoring system. The profile also includes preferences for sharing data with the other members of the consortium. The registration also includes granting access to the repository to the requesting monitoring system so that the requesting monitoring system can electronically access the repository using a network connection. In another exemplary embodiment, preferences for sharing data with the other members enables sharing of data that includes information regarding a change in availability of resources associated with the monitoring system or a change in progress on detecting or handling a cyberattack by the monitoring system. In yet another exemplary embodiment, the repository includes descriptions of recommendations and requirements for the members, where the recommendations or requirements are related to sharing data or resources with other members or detecting or handling of cyberattacks.

According to another exemplary embodiment, processing the electronic report to detect a cyberattack in the above noted method includes receiving the report of the cyberattack from the first member, identifying information relevant to the cyberattack from the repository, sending the identified information to the first member, and logging information included in the report in the repository. In another exemplary embodiment, responding to the cyberattack in the above noted method includes receiving a request from the first member for computing or human resources, and determining whether another member of the consortium has the requested resources. Upon a determination that the second member has the requested resources, a confirmation is sent to the second member for handling the cyberattack, and updates from the second member on handling the cyberattack is received. In one exemplary embodiment, the requested resources are human resources, and determining whether another member of the consortium has the requested resources includes identifying a location of the client computer system under attack, and determining whether one or more members of the consortium has a local handling station within a particular distance from the identified location of the client computer system.

In another exemplary embodiment, determining whether another member of the consortium has the requested resources is based on information regarding the cyberattack, information regarding the client computer system under attack, and information regarding the other members. In one exemplary embodiment, the information regarding the cyberattack includes data that describes a computer program perpetrating the cyberattack, a person initiating the cyberattack, a time of the cyberattack, or a scope of impact of the cyberattack. In some exemplary embodiments, the information regarding the client computer system indicates a location of the client computer system, a type of computer or computer network included in the client computer system, or an amount of processing or storage power associated with the client computing system. Further, the information regarding the other members can indicate a location of a monitoring system, an amount of processing or storage power associated with the client computing system, or a quantity of human resources associated with the client computing system.

In some exemplary embodiment, upon a determination that no other member has the requested resources, the cyberattack is reported to local authorities or national security agencies. In one exemplary embodiment, updating the repository includes updating the repository with an update received from a member on detecting or handling a cyberattack, generating summaries of the updates in the repository, storing the summaries in the repository, and sending data in the repository to each member according to a schedule chosen by the member.

Figure 18:
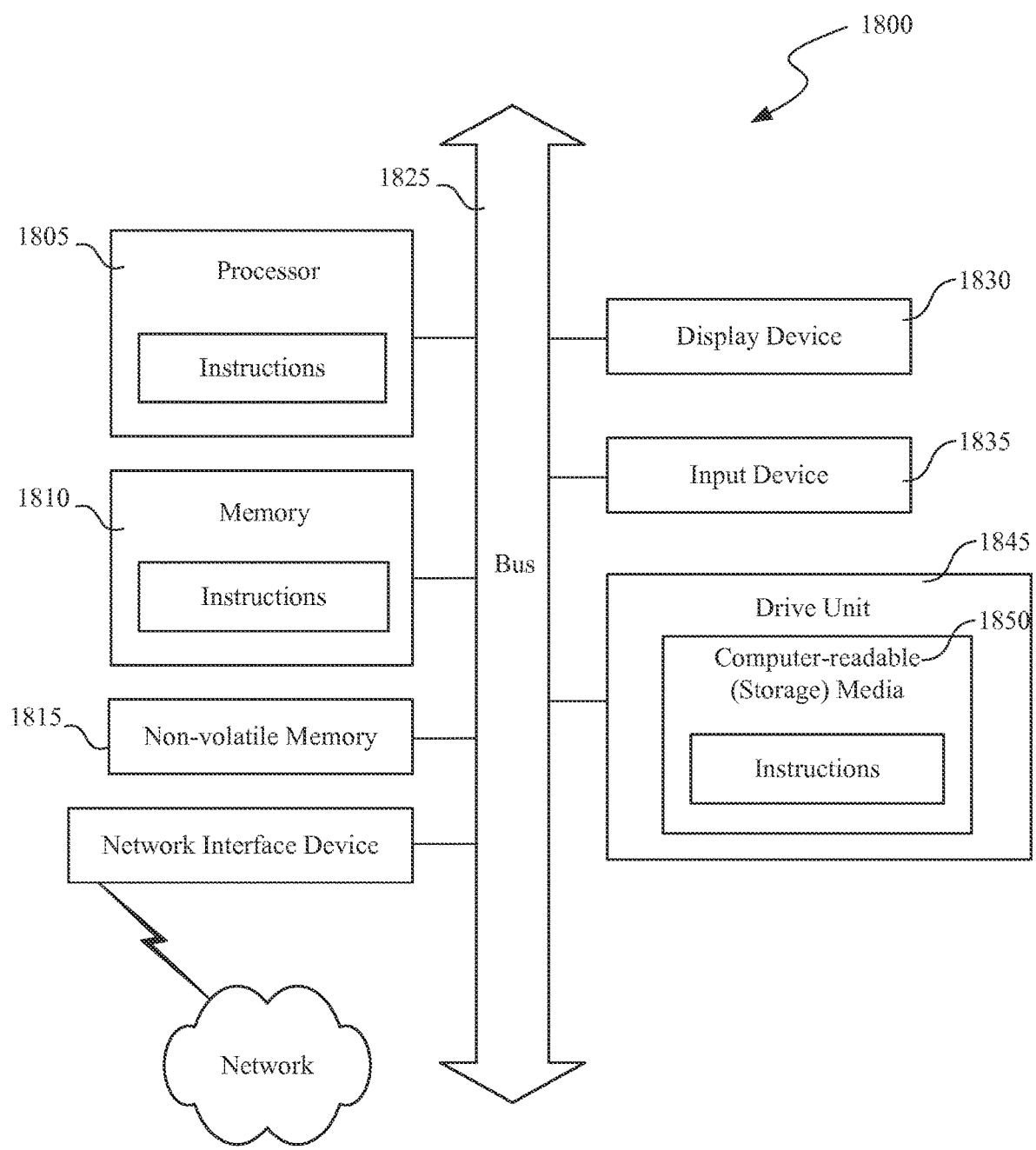
FIG. 18 shows a diagrammatic representation of a computer system on which the embodiments of the present disclosure can be implemented.

FIG. 18 shows a diagrammatic representation of a computer system 1800 on which the embodiments of the present disclosure can be implemented. The computer system 1800 generally includes a processor 1805, main memory 1810, non-volatile memory 1815, and a network interface device 1820. Various common components (e.g., cache memory) are omitted for illustrative simplicity. The computer system 1800 is intended to illustrate a hardware device on which any of the components and methods described above can be implemented. The computer system 1800 can be of any applicable known or convenient type. The components of the computer system 1800 can be coupled together via a bus 1825 or through some other known or convenient device.

The processor 1805 may be, for example, a conventional microprocessor such as an Intel Pentium microprocessor or Motorola power PC microprocessor. One of skill in the relevant art will recognize that the terms "computer system-readable (storage) medium" or "computer-readable (storage) medium" include any type of device that is accessible by the processor.

The main memory 1810 is coupled to the processor 1805 by, for example, a bus 1825 such as a PCI bus, SCSI bus, or the like. The main memory 1810 can include, by way of example but not limitation, random access memory (RAM), such as dynamic RAM (DRAM) and static RAM (SRAM). The main memory 1810 can be local, remote, or distributed.

The bus 1825 also couples the processor 1805 to the non-volatile memory 1815 and drive unit 1845. The non-volatile memory 1815 is often a magnetic floppy or hard disk, a magnetic-optical disk, an optical disk, a read-only memory (ROM), such as a CD-ROM, EPROM, or EEPROM, a magnetic or optical card, an SD card, or another form of storage for large amounts of data. Some of this data is often written, by a direct memory access process, into memory during execution of software in the computer system 1800. The non-volatile memory 1815 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 1815 and/or the drive unit 1845. Indeed, for large programs, it may not even be possible to store the entire program in the memory. Nevertheless, it should be understood that for software to run, it is moved, if necessary, to a computer readable location appropriate for processing, and for illustrative purposes, that location is referred to as the main memory 1810 in this disclosure. Even when software is moved to the memory for execution, the processor will typically make use of hardware registers to store values associated with the software and the local cache. Ideally, this use serves to speed up execution. A software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus 1825 also couples the processor to the network interface device 1820. The interface can include one or more of a modem or network interface. It will be appreciated that a modem or network interface can be considered to be part of the computer system 1800. The interface can include an analog modem, ISDN modem, cable modem, token ring interface, satellite transmission interface (e.g., "direct PC"), or other interfaces for coupling a computer system to other computer systems. The interface can include one or more input and/or output devices 1835. The I/O devices can include, by way of example but not limitation, a keyboard, a mouse or other pointing device, disk drives, printers, a scanner, speakers, DVD/CD-ROM drives, disk drives, and other input and/or output devices, including a display device. The display device 1830 can include, by way of example but not limitation, a cathode ray tube (CRT), a liquid crystal display (LCD), an LED display, a projected display (such as a heads-up display device), a touchscreen or some other applicable known or convenient display device. The display device 1830 can be used to display text and graphics. For simplicity, it is assumed that controllers of any component not depicted in the example of FIG. 18 reside in the interface.

In operation, the computer system 1800 can be controlled by operating system software that includes a file management system, such as a disk operating system. One example of operating system software with associated file management system software is the Windows® family of operating systems from Microsoft Corporation and their associated file management systems. Another example of operating system software with its associated file management system software is the Linux operating system and its associated file management system. The file management system is typically stored in the non-volatile memory 1815 and/or drive unit 1845 and causes the processor to execute the various acts required by the operating system to input and output data and to store data in the memory, including storing files on the non-volatile memory 1815 and/or drive unit 1845.

The computer system may be a server computer (e.g., a database server); a client computer; a personal computer (PC); a tablet, a phablet, a wearable device; a laptop computer; a set-top box (STB); a personal digital assistant (PDA); a cellular telephone; an iPhone; a Blackberry; a processor; a telephone; a web appliance; a network router, switch or bridge; or any computer system capable of executing a set of instructions (sequential or otherwise) that specify actions to be taken by that computer system.

While the computer system-readable medium or computer system-readable storage medium 1850 is shown in an exemplary embodiment to be a single medium, the terms "computer system-readable medium" and "computer system-readable storage medium" should be taken to include a single medium or multiple media (e.g., a centralized or distributed database and/or associated caches and servers) that store the one or more sets of instructions. The terms "computer system-readable medium" and "computer system-readable storage medium" shall also be taken to include any medium that is capable of storing, encoding or carrying a set of instructions for execution by the computer system and that causes the computer system to perform any one or more of the methodologies of the presently disclosed technique and innovation.

By the way of example, one aspect of the disclosed technology is implemented as a central monitoring station of a monitoring system for detecting and handling cyberattacks to client systems with a management system that manages a consortium of monitoring systems. The central monitoring station includes a network interface configured to receive and transmit information using a computer network, a processor and a memory comprising processor executable instructions. The processor executable instructions upon execution by the processor, configure a plurality of components of the central monitoring station to detect and respond to cyberattacks to client systems. The plurality of components include a registering component configured to register the central monitoring station with the management system as a member of the consortium of the monitoring systems, a detecting component configured to detect a cyberattack to a client computer system, a handling component configured to respond to the cyberattack, a reporting component configured to send an update to the management system on detecting or responding to the cyberattack for sharing by other members of the consortium of monitoring systems, and an updating component configured to receive data from the management system on detecting and handling a cyberattack created by the management system and other members. Each of the monitoring systems includes one or more central monitoring stations, and each of the central monitoring stations is associated with one or more specialists with access the client computer systems. Further, at least one of the monitoring systems includes one or more local handling stations, and the central monitoring stations and local handling stations in each of the monitoring systems are interconnected with a distinct local network connection.

In one exemplary embodiment, the registering component is further configured to create a profile, where the profile includes information on computing and human resources associated with the central monitoring station, and the profile includes preferences for sharing data with the other members. In another exemplary embodiment, the detecting component is further configured to send a notification to the client computer system under attack. In still another exemplary embodiment, the handling component includes a first determining unit configured to determine a resource need for handling the cyberattack, a second determining unit configured to determine whether the monitoring system can satisfy the resource need, and a requesting unit configured to, upon a determination by the second determining unit that the monitoring system cannot satisfy the resource need, send a request to the management system for resources from another monitoring system, and receive updates from the management system on handling the cyberattack.

According to one exemplary embodiment, the first determining unit makes the determination based on information regarding the cyberattack and information regarding the client computer system. In another exemplary embodiment, the requesting unit is further configured to, upon a determination by the second determining unit that the monitoring system can satisfy the resource need, assign one or more other central monitoring stations or local handling stations to handling the cyberattack, and receive updates from each assigned central monitoring station or local handling station on a status of handling the cyberattack.

According to one exemplary embodiment, the reporting component sends to the management system information regarding a change in availability of resources associated with the monitoring system or a change of status of detecting or handling the cyberattack by the monitoring system. In another exemplary embodiment, the updating component is further configured to analyze data created by the management system and other members of the consortium to characterize the cyberattack, including identification of a computer program perpetrating the cyberattack or an attacker initiating the cyberattack, and send results obtained from characterization of the cyberattack and identification of the computer program or the attacker to the management system.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

What is claimed is:

1. A central monitoring station of a monitoring system for detecting and handling cyberattacks to client systems with a management system that manages a consortium of monitoring systems, comprising:
    a network interface configured to receive and transmit information using a computer network; and
    a processor and a memory comprising processor executable instructions, the processor executable instructions upon execution by the processor, configuring a plurality of components of the central monitoring station to detect and respond to cyberattacks to client systems, the plurality of components configured to:
        register the central monitoring station with the management system as a member of the consortium of the monitoring systems;
        detect a cyberattack to a client computer system;
        respond to the cyberattack;
        send an update to the management system on detecting or responding to the cyberattack for sharing by other members of the consortium of monitoring systems;
        receive data from the management system on detecting and handling a cyberattack created by the management system and other members, wherein each of the monitoring systems comprises one or more central monitoring stations, each of the central monitoring stations associated with one or more specialists with access the client computer systems; and
        compute a real-time damage assessment based on the detected cyberattack,
    wherein at least one of the monitoring systems comprises one or more local handling stations, wherein the central monitoring stations and local handling stations in each of the monitoring systems are interconnected with a distinct local network connection;
    wherein the real-time damage assessment comprises a weighted average including a first weight indicating a likelihood of one or more cyberattacks, a second weight indicating a likelihood of success of the one or more cyberattacks, and a third weight indicating a measure of severity of damage; and
    wherein the first, second, and third weights are based at least in part on historical information captured by one or more computer systems.

2. The central monitoring station of claim 1, wherein at least one of the plurality of components is further configured to send a notification to the client computer system under attack.

3. The central monitoring station of claim 1, wherein at least one of the plurality of components sends to the management system information regarding a change in availability of resources associated with the monitoring system or a change of status of detecting or handling the cyberattack by the monitoring system.

4. The central monitoring station of claim 1, wherein one or more of the plurality of components are further configured to implement predetermined rules to be followed by all central monitoring stations of the members.

5. A computer implemented method of managing a consortium of monitoring systems which detect and handle cyberattacks, comprising: registering each of a plurality of monitoring systems as a member in response to
    corresponding registration requests for becoming a member of the consortium of monitoring systems, wherein each of the monitoring systems is associated with a distinct, independent business entity and each of the monitoring systems comprises one or more central monitoring stations, each of the central monitoring stations comprising a processor and a memory and monitoring one or more client computer systems for cyberattacks to the client computer systems and associated with one or more specialists who can physically work with the client computer systems, and wherein at least one of the monitoring systems comprises one or more local handling stations;
    receiving a report in electronic format from a first member coupled to a computer network;
    processing the electronic report to detect a cyberattack to a client computer system of the first member;
    responding to the cyberattack with the first member and a second member, wherein the second member assigns computing resources or human resources for mitigating the cyberattack;

updating a repository of data related to cyberattacks accessible to members of the consortium; and computing a real-time damage assessment based on the detected cyberattack; wherein the real-time damage assessment comprises a weighted average including a first weight indicating a likelihood of one or more cyberattacks, a second weight indicating a likelihood of success of the one or more cyberattacks, and a third weight indicating a measure of severity of damage; and wherein the first, second, and third weights are based at least in part on historical information captured by one or more computer systems.

6. The method of claim 5, wherein processing the electronic report to detect a cyberattack comprises:

receiving the report of the cyberattack from the first member;

identifying information relevant to the cyberattack from the repository;

sending the identified information to the first member; and logging information included in the report in the repository.

7. A computer program product embodied on one or more non-transitory computer readable media, comprising:

program code for registering each of a plurality of monitoring systems as a member in response to corresponding registration requests for becoming a member of a consortium of monitoring systems, wherein each of the monitoring systems is associated with a distinct, independent business entity and each of the monitoring systems comprises one or more central monitoring stations, each of the central monitoring stations comprising a processor and a memory and monitoring one or more client computer systems for cyberattacks to the client computer systems and associated with one or more specialists who can physically work with the client computer systems, and wherein at least one of the monitoring systems comprises one or more local handling stations;

program code for receiving a report in electronic format from a first member coupled to a computer network;

program code for processing the electronic report to detect a cyberattack to a client computer system of the first member;

program code for responding to the cyberattack with the first member and a second member, wherein the second member assigns computing resources or human resources for mitigating the cyberattack;

program code for updating a repository of data related to cyberattacks accessible to members of the consortium; and program code for computing a real-time damage assessment based on the detected cyberattack;

wherein the real-time damage assessment comprises a weighted average including a first weight indicating a likelihood of one or more cyberattacks, a second weight indicating a likelihood of success of the one or more cyberattacks, and a third weight indicating a measure of severity of damage and wherein the first, second, and third weights are based at least in part on historical information captured by one or more computer systems.

\* \* \* \* \*